United States Patent [19]

Matsushima

[11] Patent Number: 4,586,055

[45] Date of Patent: Apr. 29, 1986

[54] METHOD AND APPARATUS FOR PRINTING COLORED PATTERNS

[75] Inventor: Keiichi Matsushima, Yokohama, Japan

[73] Assignee: Aimor Denshi Kabushiki Kaisha, Tokyo, Japan

[21] Appl. No.: 675,393

[22] Filed: Nov. 27, 1984

[30] Foreign Application Priority Data

Apr. 17, 1984 [JP] Japan ............................... 59-077052

[51] Int. Cl.[4] ............................................ G01D 15/10

[52] U.S. Cl. ............................... 346/76 PH; 346/106; 346/1.1; 400/240

[58] Field of Search ................. 346/76 PH, 1.1, 76 R, 346/105, 106; 400/120, 240, 240.1, 240.2, 240.3, 240.4, 224; 219/216 PH

[56] References Cited

U.S. PATENT DOCUMENTS 4,250,511 2/1981 Stein et al. ..................... 346/76 PH

OTHER PUBLICATIONS

IBM Technical Disclosure Bulletin, vol. 21, No. 5, Oct. 1978, pp. 1828–1829.

*Primary Examiner*—E. A. Goldberg
*Assistant Examiner*—A. Evans
*Attorney, Agent, or Firm*—Wenderoth, Lind & Ponack

[57] ABSTRACT

A method of and an apparatus for printing patterns of information on a record sheet, wherein those selected out of a number of printer elements arranged in an array are actuated to heat selected ones of differently colored, recurrent colored sections of a variegated, heat-sensitive ink ribbon for producing dots of different colors on the record sheet during each of a predetermined number of dot printing steps of a line printing cycle.

27 Claims, 10 Drawing Figures

METHOD AND APPARATUS FOR PRINTING COLORED PATTERNS

FIELD OF THE INVENTION

The present invention relates to printers and, more particularly to a multi-color thermal printing apparatus by means of which patterns of information such as, for example, alphabetic, numerical and other letters, characters or symbols and graphic patterns are to be printed in different colors on a record sheet of, for example, paper by application of heat to a variegated, thermally activated inking medium.

BACKGROUND OF THE INVENTION

A monochromic thermal printer is known which uses as the inking medium a length of relatively broad strip of a film coated with heat-sensitive ink. A standardized version of such an inking medium has a width of about 210 mm and a thickness within the range of from about 10 microns to 30 microns. Because of its width which is relatively large for the thickness, an inking medium of this nature tends to produce wrinkles and to locally deviate on a record sheet or printing paper and can not be wound on a take-up roll smoothly and uniformly.

In an attempt to provide a solution to this problem, it has been proposed to use a thermally activated inking medium of ribbon form having a reduced width of, typically, from about 10 mm to 20 mm as a substitute for the prior inking medium in the form of a broad strip. A thermal printer using such an advanced heat-sensitive inking medium is disclosed in, for example, Japanese Provisional Patent Publication No. 55-55883. The heat-sensitive ink ribbon is coated or impregnated with ink of, usually, black color throughout its length and, for this reason, the thermal printer using the ribbon is not operable for printing patterns of information in different colors.

It is, accordingly, an important object of the present invention to provide a novel multicolor thermal printing method and a novel multi-color thermal printing apparatus which exploits all of the advantages attainable by prior-art thermal printers using single-colored ink ribbons of reduced widths.

To accomplish this purpose, the present invention proposes to use a continuous, variegated heat-sensitive ink ribbon which is coated or impregnated with inks of different colors. The ink ribbon has a series of recurrent, discrete colored sections which are contiguous to one another throughout the length of the ribbon and which consist of first-colored sections inked in a first color such as yellow, second-colored sections inked in a second color such as magenta and third-colored sections inked in a third color such as cyanic blue. The first, second and third-colored sections occur, lengthwise of the ribbon, successively and recurrently with a unit series-consisting of one first-colored section, one second-colored section subsequent to the first-colored section, and one third-colored section subsequent to the second-colored section. The first and third-colored sections of each unit series are respectively subsequent to and preceding the third and first-colored sections of the immediately preceding and subsequent unit series.

During a printing operation using such a heat-sensitive parti-colored ink ribbon, the ribbbn is driven to travel along an array of heater elements forming a printing head and is caused to frequently stop and restart at predetermined time intervals. In this instance, difficulties are experienced in enabling the ink ribbon to stop in correct positions with respect to the array of the heater elements of the printing head. Furthermore, the ink ribbon, which is susceptible to changes in tension and ambient temperature, tends to shrink over some areas and elongate over other areas during operation of the printer. The local shrinkage and elongation of the ribbon results in fluctuations in the lengths of the individual colored sections of the ribbon and makes it difficult for the ribbon to have the individual colored sections located correctly in registry with those sets of heater elements of the printing head which should be associated with the respective colored sections during each dot printing step. It may thus happen that some or even all sets of heater elements of the printing head are brought into registry with longitudinal portions of the ink ribbon which contain the boundaries between the adjacent colored sections of the ribbon. When a boundary between any adjacent two colored sections of the ink ribbon happens to be located between those two sets of heater elements which should be respectively located in registry with these two colored sections, the dots which should have been printed in a certain color by one of these two colored sections will be printed some in one color and the others in another. This results in unintended distribution of colors in the printed information pattern and possibly further in indistinctness of the pattern from the environment of the record sheet.

The present invention further contemplates resolution of these problems. It is, accordingly, another important object of the present invention to provide a novel multicolor thermal printing method and an improved multi-color thermal printing apparatus which are useful for avoiding unintended, objectionable distribution of colors in printed patterns of information and for forming printed patterns of information with clear-cut contours even when the ink ribbon may have failed to have some of its colored sections located correctly with respect to the heater elements of the printing head.

SUMMARY OF THE INVENTION

In accordance with one important aspect of the present invention, there is provided a method of printing dots of at least two different colors including first and second colors on a record sheet with use of a printing head having a multiplicity of heater elements which are arranged in an array extending along a substantially straight print line and which are operative to produce heat independently of one another and an elongated heat-sensitive ink ribbon extending between the record sheet and the array of the heater elements and having a series of recurrent colored sections which are contiguous to one another and which are inked in the aforesaid colors, the colored sections of the first and second colors occurring, lengthwise of the medium, successively and recurrently with a unit series including one colored section of the first color and one colored section of the second color, all the colored sections of the ink ribbon having a predetermined length, the method having a succession of line forming cycles each for forming a single line of dots in at least one of the aforesaid different colors on the record sheet, each of the line forming cycles consisting of a predetermined number of dot printing steps, comprising driving the record sheet to advance a predetermined distance across the above mentioned print line in a direction substantially perpendicular to the print line during each line forming cycle;

driving the ink ribbon to travel with respect to the printing head in a predetermined direction generally parallel but angled at a small angle to the direction of travel of the record sheet during each dot printing step; on the basis of control signals supplied from an external source, selecting out of the heater elements of the printing head the heater elements to be actuated to generate heat during each dot printing step; and actuating the selected heater elements for producing dots of at least one of the aforesaid colors on the ink ribbon during each dot printing step.

In accordance with another important aspect of the present invention, there is provided a multi-color thermal printing apparatus for printing dots of at least two different colors including first and second colors on a record sheet, comprising sheet driving means operative to drive the record sheet in a predetermined direction during a line forming cycle consisting of a predetermined number of dot printing steps; a printing head including a multiplicity of heater elements which are arranged in an array extending along a print line substantially perpendicular to the direction of travel of the record sheet and which are operative to produce heat independently of one another when actuated; an elongated heat-sensitive ink ribbon extending between the record sheet and the array of the heater elements and having a series of recurrent colored sections which are contiguous to one another and which are inked in the aforesaid colors, the colored sections of the first and second colors occurring, lengthwise of the medium, successively and recurrently with a unit series including one colored section of the first color and one colored section of the second color, all the colored sections of the ink ribbon having a predetermined length; ribbon drive means operative to drive the ink ribbon in a direction which is generally parallel but angled at a small angle to the direction of travel of the record sheet; and control means operative to select out of the heater elements of the printing head the heater elements to be actuated to generate heat for producing dots of at least one of the above mentioned colors on the ink ribbon during each dot printing step.

BRIEF DESCRIPTION OF THE DRAWINGS

The drawbacks of a prior-art multi-color thermal printing apparatus and the features and advantages of a method and an apparatus according to the present invention will be more clearly understood from the following description taken in conjunction with the accompanying drawings in which like reference numerals and characters designate similar or corresponding assemblies, units, and elements and in which.

DESCRIPTION OF THE PRIOR ART

Figure 1:
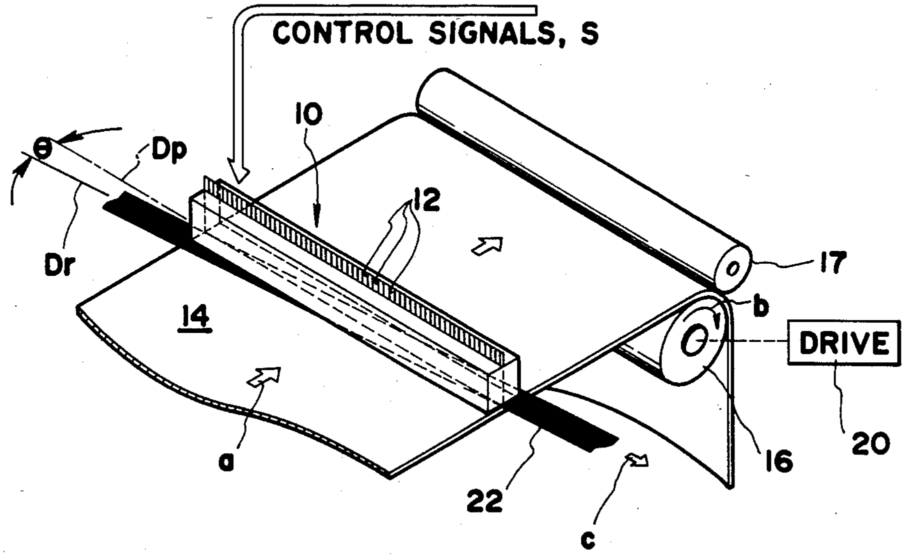
FIG. 1 PRIOR ART
FIG. 1 is a perspective view showing part of a prior-art monochromic thermal printer.

Referring to FIG. 1 of the drawings, there is shown a prior-art thermal printer of the type which is taught in Japanese Provisional Patent Publication No. 55-55883. The known thermal printer includes a printing head 10 having a multiplicity of heater elements 12. The printing head 10 extends in a direction perpendicular to the direction of arrow a in which a record sheet 14 of paper is to be driven to travel during operation of the printer. The heater elements 12 are arranged in an array along the printing head 10 and thus define a print line $D_p$ perpendicular to the direction a of travel of the record sheet 14. The individual heater elements 12 are jointly connected to a common source (not shown) of electric power and are selectively energized during each dot printing step under the control of printing information signals S which contain those indicative of the patterns to be printed on the record sheet 14. As the succession of dot printing steps proceeds, the record sheet 14 is driven to stepwise advance past the printing head 10 in the direction of the arrow a by the aid of feed rolls 16 and 18 one of which is driven for rotation in the direction of arrow b by suitable drive means 20.

Between the printing head 10 and the record sheet 14 is provided a continuous heat-sensitive ink ribbon 22 which is coated or impregnated with ink of, usually, black color as previously mentioned. The ink ribbon 22 extends in a direction $D_r$ inclined to the above mentioned print line $D_p$ through a predetermined small angle $\theta$ and is driven to travel a predetermined distance in this direction during each dot printing step as indicated by arrow c.

The ink ribbon 22 used in the prior-art thermal printer generally constructed and arranged as described above is inked in a single color throughout its length and, for this reason, the thermal printer using such an ink ribbon can not be utilized to print patterns of information in different colors. A prime object of the present invention is to improve a known thermal printer of the described nature with a view to enabling the printer to operate for multi-color thermal printing purposes as mentioned at the outset of the description.

DETAILED DESCRIPTION OF THE PREFERRED EMBODIMENTS

Figure 2:
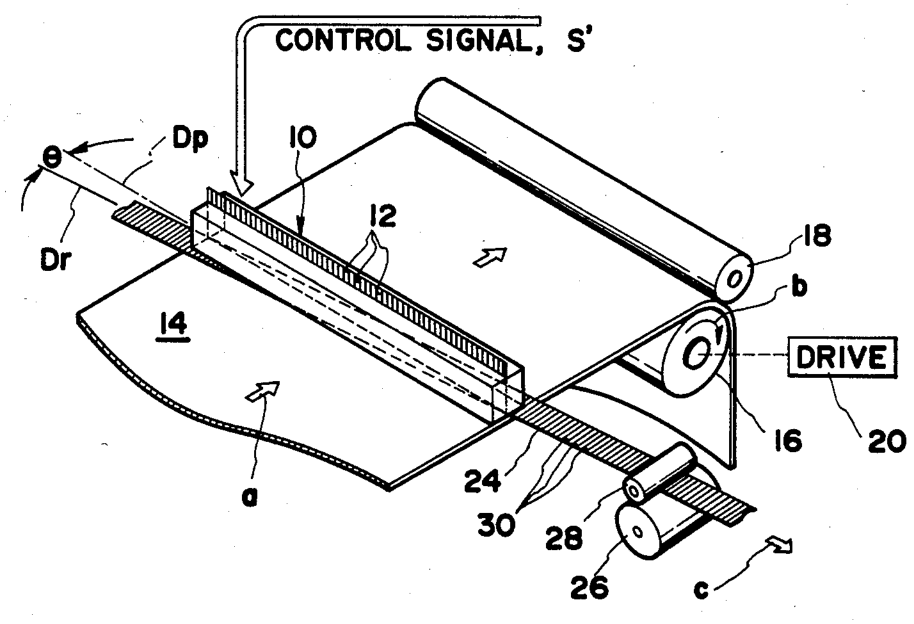
FIG. 2 is a view similar to FIG. 1 but shows the mechanical arrangement of a first preferred embodiment of a multicolor thermal printing apparatus according to the present invention.

Referring to FIG. 2 of the drawings, a multi-color thermal printing apparatus embodying the present invention is shown, by way of example, as being basically similar in mechanical construction to the prior-art monochromic thermal printer of the type described with reference to FIG. 1. Thus, those members and elements which have their counterparts in the thermal printer of FIG. 1 are designated by like reference numerals in FIG. 2.

The multi-color thermal printing apparatus shown in FIG. 2 comprises a printing head 10 having a multiplicity of heater elements 12 and positioned over a suitable platen (not shown). The printing head 10 longitudinally extends in a direction perpendicular to the direction of arrow a in which a record sheet 14 of, for example, paper lying on the platen is to be driven to travel during operation of the printer. The heater elements 12 are arranged in a linear array along the printing head 10 and thus define a print line $D_p$ perpendicular to the direction a of travel of the record sheet 14. The individual heater elements 12 are jointly connected to a common source (not shown) of electric power and are selectively energized during each dot printing step under the control of printing information signals S′ which contain those indicative of the patterns to be printed on the record sheet 14. These signals S′ are supplied from a suitable control module (not shown). As the succession of dot printing steps proceeds, the record sheet 14 is intermittently driven to advance past the printing head 10 in the direction of the arrow a by the aid of feed rolls 16 and 18 one of which is driven for rotation in the direction of arrow b by suitable drive means 20, the other roll being held in rolling engagement with the driven roll through the record sheet 14.

Between the printing head 10 and the record sheet 14 or, more exactly, the printing head 10 and the above mentioned platen is provided a continuous, variegated heat-sensitive ink ribbon 24 which is coated or impregnated with inks of different colors and which is stretched between suitable feed and take-up means such as a feed reel and a take-up reel, though not shown in the drawings. These feed and take-up means are disposed so that the ink ribbon 24 extends in a direction of arrow $D_r$ inclined to the print line $D_p$ through a predetermined angle $\theta$ as in the case of the prior-art printer arrangement shown in FIG. 1. The ink ribbon 24 is driven to travel in this direction during each dot printing step as indicated by arrow c. Being thus arranged to skew across the print line $D_p$, the ink ribbon 24 is subjected to heat from one longitudinal edge of the ribbon to the other as the dot printing steps proceed and can therefore be used up practically throughout the width thereof. In this instance, it will be apparent that such an advantage can be achieved by selecting the angle $\theta$ to be larger than 0 degrees and smaller than 90 degrees. The ink ribbon 24 is driven to travel in the direction of the arrow $D_r$ by suitable ribbon drive means which is shown comprising a combination of rollers 26 and 28 at least one of which is mechanically connected to, for example, a suitable driving source such as a motor (not shown), the other of the rollers being held in rollable contact with the driven roller. Though not shown in the drawings, there is further provided ribbon drive control means adapted to drive the ink ribbon 24 to stepwise travel through a predetermined distance during each dot printing step.

The heater elements 12 of the printing head 10 may be formed by the use of a photolithographic technology used for the fabrication of semiconductor integrated circuits. For this purpose, a thin film of a conductor patterned in the form of a comb may be formed on a substrate by a photolithographic process with resistor elements located respectively at the tips of the individual teeth of the pattern. The printing head having the heater elements formed in this fashion is known as a multistylus pen and is adapted to generate heat in each of the heater elements independently of the others. The above mentioned printing information signals S′ are supplied respectively to the individual heater elements or individual pairs of adjacent heater elements of such a multi-stylus pen printing head 10 through a suitable control circuit (not shown).

Figure 3:
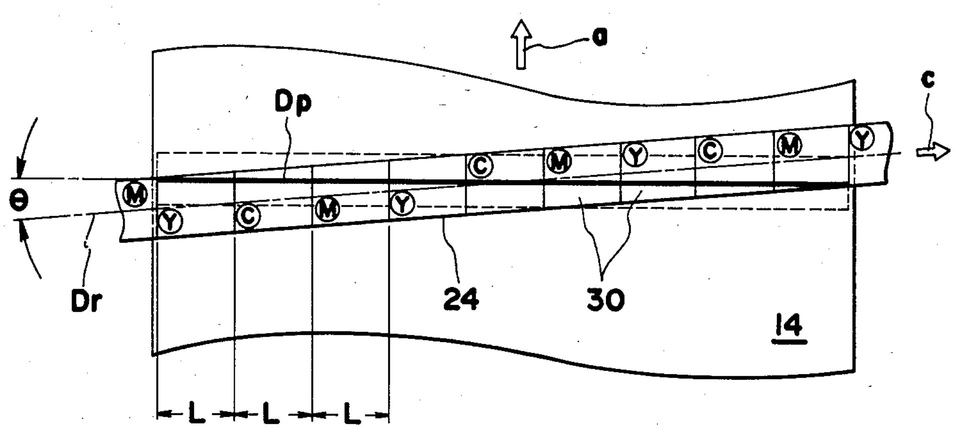
FIG. 3 is a schematic plan view showing the arrangement of an ink ribbon used as the variegated, heat-sensitive inking medium and extending along the print line in the printing apparatus shown in FIG. 2.

FIG. 3 shows a portion of the variegated ink ribbon 24 used as the thermally activated inking medium and the arrangement of the ribbon extending over the record sheet 14 in the printing apparatus shown in FIG. 2. As will be seen therefrom, the ink ribbon 24 has a series of recurrent, discrete colored sections 30 which are contiguous to one another throughout the length of the ink ribbon 24. The colored sections 30 consist of first-colored sections Y inked in a first color, second-colored sections M inked in a second color and third-colored sections C inked in a third color. The first, second and third-colored sections Y, M and C occur, lengthwise of the ribbon, successively and recurrently with a unit series consisting of one first-colored section Y, one second-colored section M subsequent to the first-colored section Y, and one third-colored section C subsequent to the second-colored section M. The first and third-colored sections Y and C of each unit series are respectively subsequent and preceding to the third and first-colored sections C and Y of the immediately preceding and subsequent unit series. Each of the colored sections Y, M and C of the ink ribbon 24 thus formed has a predetermined length L as shown. By way of example, the first-colored sections Y, second-colored sections M and third-colored sections C of the ink ribbon 24 used in the shown embodiment are assumed to be inked in yellow, magenta and cyanic blue, respectively.

In operation, the above mentioned drive means including the rollers 26 and 28 is actuated to drive the ink ribbon 24 to lengthwise travel a distance equal to the length L of each of the colored sections Y, M and C of the ribbon during each dot printing step and rightwardly in the direction $D_r$ as indicated by arrow c in FIG. 3. After being moved over this distance, the ink ribbon 24 is held at rest on the record sheet 14 and extends at the angle $\theta$ with respect to the print line $D_p$ defined by the heater elements 12 of the printing head 10. Under this condition, each of the colored sections Y, M and C of that portion of the ink ribbon 24 which extends from one end of the print line $D_p$ to the other is associated with and located underneath a predetermined number of heater elements 12 of the printing head 10. The heater elements 12 of the printing head 10 are then selectively actuated to generate heat under the control of the printing information signals S′ supplied to the printing head 10. Selected ones of the colored sections Y, M and C of the ink ribbon 24 are subjected to heat at the spots which register with the actuated ones of the heater elements 12 and produce on the surface of the record sheet 14 dots of one, two or all of the colors of the first, second and third-colored sections Y, M and C of the ink ribbon 24. If, thus, those heater elements 12 of the printing head 10 which are located in registry with one of, for example, the first-colored sections Y of the ink ribbon 24 are actuated in response to the signals S', the colored section Y is subjected to the heat generated by these heater elements 12 and is caused to produce yellow colored dots on the surface of the record sheet 14 at the spots which are located in registry with the particular heater elements 12.

At the end of the first dot printing step, all the heater elements 12 of the printing head 10 that have been actuated during the first dot printing step are de-energized and the ink ribbon 24 is driven to lengthwise travel a distance equal to the length L of each colored section 30 of the ribbon 24. It therefore follows that the first set of heater elements 12 which has been associated with the above mentioned first-colored section Y of the ink ribbon 24 during the first dot printing step is brought into registry with the second-colored section M immediately subsequent to the colored section Y under consideration, whereby the particular colored section M is subjected to the heat generated by these particular heater elements 12 and is caused to produce magenta colored dots on the surface of the record sheet 14 at the spots which are located some aside and some on the yellow colored dots produced on the record sheet 14 during the preceding first dot printing step. During the second dot printing step, the second set of heater elements 12 located to the right of the first set of heater elements 12 in FIG. 3 registers with that first-colored section Y which has been subjected to the heat generated by the first set of heater elements 12 during the first dot printing step and causes the particular colored section Y of the ink ribbon 24 to produce yellow colored dots on the surface of the record sheet 14 at the spots which are located to the right of the set of yellow colored dots printed on the record sheet 14 during the first dot printing step.

Subsequently to this second dot printing step, the ink ribbon 24 is further driven to travel a distance equal to the length L of each colored section of the ribbon 24. The result is that the first set of heater elements 12 which has been associated with the aforesaid second-colored section M of the ink ribbon 24 during the second dot printing step is brought into registry with the third-colored section C immediately subsequent to the particular colored section M. The colored section C is thus subjected to the heat generated by the first set of heater elements 12 and is caused to produce cyanic blue colored dots on the surface of the record sheet 14 at the spots which are located in registry with these particular heater elements 12 and which are located some aside and some on the yellow colored dots printed during the first dot printing step and the magenta colored dots printed on the record sheet 14 during the second dot printing step. During the third dot printing step, the second set of heater elements 12 located to the right of the first set of heater elements 12 is brought into registry with the second-colored section M which has been subjected to the heat generated by the first set of heater elements 12 during the second dot printing step and causes the particular colored section M to produce magenta colored dots on the surface of the record sheet 14 at the spots which are located to the right of the set of magenta colored dots printed during the second dot printing step.

Yellow, magenta and cyanic blue colored dots are in these manners printed on the surface of the record sheet 14 along and throughout the print line $D_p$ during each line forming cycle which consists of three successive dot printing steps. Upon completion of each line forming cycle, the drive means 20 associated with the feed rollers 16 and 18 (FIG. 2) is actuated to drive the record sheet 14 to advance a predetermined distance in the direction of the arrow a. By repetition of such a line forming cycle, patterns of information are thus printed in yellow, magenta and cyanic blue on the surface of the record sheet 14 in accordance with the pattern data contained in the printing information signals S' supplied to the printing head 10. As the ink ribbon 24 is driven to travel stepwise, the ink ribbon 24 skews across the print line $D_p$ and is subjected to heat from the front longitudinal edge of the ribbon toward the rear longitudinal edge.

During operation of the multi-color thermal printing apparatus as above described, the ribbon drive means including the rollers 26 and 28 shown in FIG. 2 is controlled to frequently stop and restart the travel of the ink ribbon 24 at predetermined time intervals. It has been found that some difficulties are experienced in enabling the ink ribbon 24 to stop at correct positions with respect to the array of the heater elements 12 of the printing head 10. Furthermore, the ink ribbon 24 which is susceptible to changes in tension and ambient temperature tends to locally shrink and elongate during operation of the printer. The localized shrinkage and elongation of the ink ribbon 24 results in fluctuations in the lengths of the individual colored sections Y, M and C and makes it difficult for the ink ribbon 24 to have its colored sections Y, M and C located correctly in registry with those sets of heater elements 12 of the printing head 10 which should be associated with the respective colored sections Y, M and C during each dot printing step. It may thus happen that some or even all sets of heater elements 12 of the printing head 10 are brought into registry with longitudinal portions of the ink ribbon 24 which contain the boundaries between the adjacent colored sections Y, M and C. When a boundary between any adjacent two colored sections of the ink ribbon 24 happens to be located between those two sets of heater elements 12 which should be respectively located in registry with these two colored sections, the dots which should have been printed in a certain color by one of these two colored sections will be printed some in one color and the others in another. This results in unintended distribution of colors in the printed pattern of information and possibly further in indistinctness of the pattern from the environment of the record sheet 14, as previously noted.

Thus, the present invention further contemplates provision of useful solutions to these problems avoiding unintended, objectionable distribution of colors in printed patters of information and for forming printed patterns of information with clear-cut contours even when the ink ribbon 24 may have failed to have some of its colored sections Y, M and C located correctly with respect to the heater elements 12 of the printing head 10 in the arrangement shown in FIG. 2.

Figure 4:
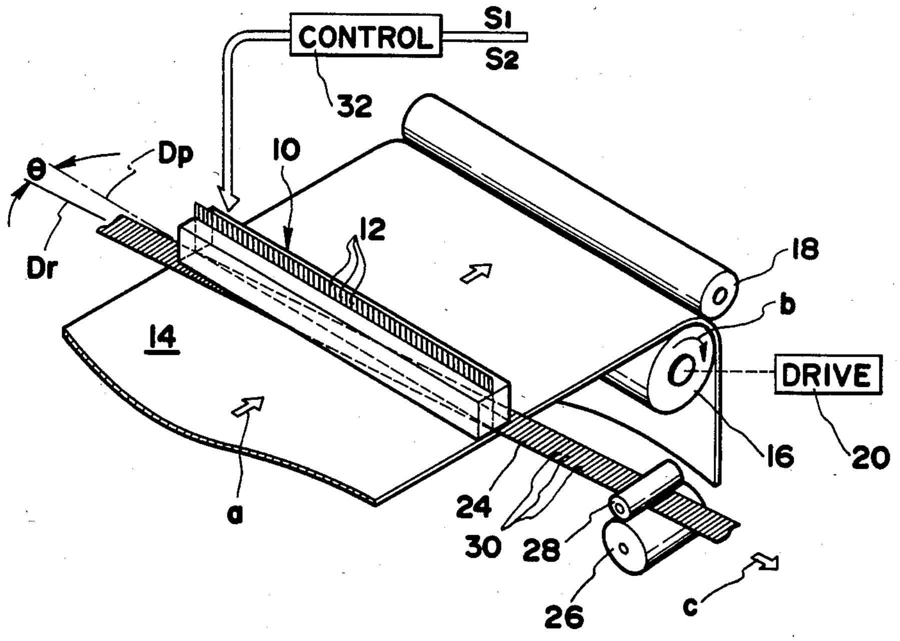
FIG. 4 is a view also similar to FIG. 1 but shows the mechanical arrangement of a second preferred embodiment of a multi-color thermal printing apparatus according to the present invention.

To accomplish these additional objects of the present invention, the multi-color thermal printing apparatus shown in FIG. 4 is provided with control means 32 responsive to signals including print control signals $S_1$ and printing information signals $S_2$. As will be described in detail, the print control signals $S_1$ are effective to select particular ones out of the unit heating zones by each of which the heater elements 12 of the printing head 10 are to be actuated and to determine the time durations for which the selected heater elements 12 are to be maintained energized during each dot printing step, such time durations being variable from one to another of the colors in which prints are to be produced. The print control signals $S_1$ are supplied in the form of logic 0 and 1 pulses from a suitable pulse distribution circuit (not shown) which may form part of the above mentioned control means 32 or of, for example, a computer. On the other hand, the printing information signals $S_2$ are supplied, also in the form of logic 0 and 1 pulses, from an external source (not shown) such as a computer and are representative of the patterns and the distribution of the colors of the information to be printed, thus containing the data regarding the alphabetic, numerical and other letters, characters or symbols or the graphic patterns to be printed.

In the multi-color thermal printing apparatus shown in FIG. 4, the drive means including the ribbon drive rollers 26 and 28 is controlled to operate in such a manner as to drive the ink ribbon 24 to travel a predetermined distance $\Delta l$ during each dot printing step. The distance of travel $\Delta l$ of the ink ribbon 24 is selected to be smaller than the length L of each of the colored sections Y, M and C of the ink ribbon 24 and is herein assumed, by way of example, as being approximately equal to one third of the length L.

Figure 5:
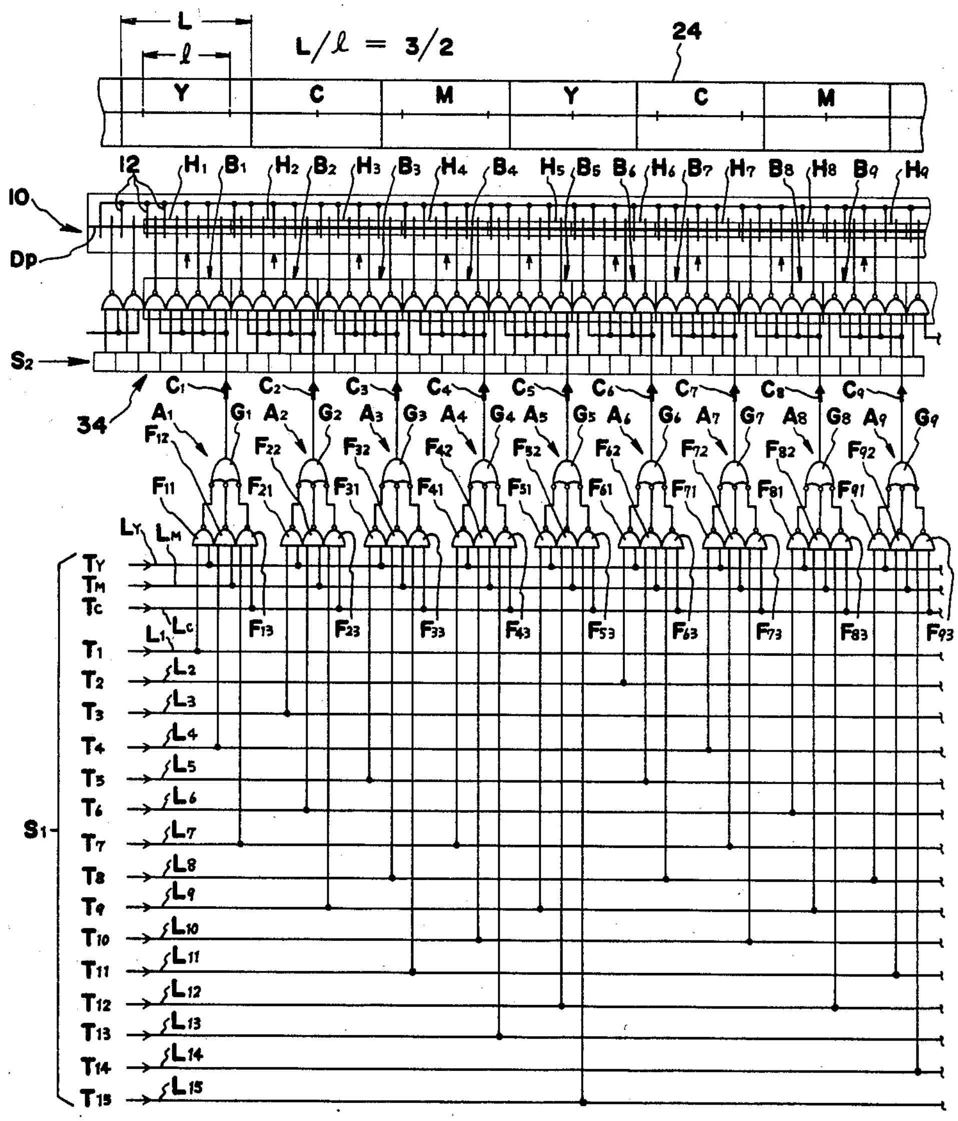
FIG. 5 is a schematic diagram showing the circuit arrangement of a preferred example of a unit network which forms part of the complete circuitry included in electric control means of the embodiment illustrated in FIG. 4.

FIG. 5 of the drawings shows part of the construction and arrangement of the control means 32 in conjunction with the heater elements 12 of the printing head 10 and with the pattern of variegation of the ink ribbon 24 a portion of which is shown at the top of FIG. 5. In the arrangement of the heater elements 12 of the printing head 10 which is illustrated below the portion of the ink ribbon 24, the heater elements 12 consist of a plurality of groups, or zones, each consisting of a predetermined number of heater elements 12 as will be understood as the description proceeds. The circuit arrangement shown in FIG. 5 constitutes one of a plurality of identical unit networks which form the complete circuitry included in the control means 32 shown in FIG. 4. All the individual unit networks forming the complete circuitry are similar in construction and arrangement to each other and, thus, the unit network shown in FIG. 5 represents each of the other unit networks of the complete circuitry.

The unit network shown in FIG. 5 comprises a total of nine, first to ninth, zone select circuits $A_1$ to $A_9$ responsive to the print control signals $S_1$. These zone select circuits $A_1$ to $A_9$ are respectively associated with the above mentioned groups or zones of the heater elements 12 of the printing head 10 and are adapted to select candidate groups or zones of the heater elements which may be energized responsive to the printing information signals $S_2$. These first to ninth zone select circuits $A_1$ to $A_9$ comprise three-input logic NOR gates consisting of first to ninth NOR gates $G_1$ to $G_9$, respectively, which are arranged in parallel with the array of the heater elements 12 of the printing head 10. Each of the nine NOR gates $G_1$ to $G_9$ has three input terminals respectively connected to three two-input logic NAND gates which are designated by $F_{i1}$, $F_{i2}$ and $F_{i3}$ where "i" represents the subscript to the reference character assigned to the NOR gate to which the three NAND gates are connected. Thus, the three NAND gates connected to the input terminals of the first NOR gate $G_1$ are denoted by $F_{11}$, $F_{12}$ and $F_{13}$, respectively, and, likewise, the three NAND gates connected to the input terminals of the ninth NOR gate $G_9$ are denoted by $F_{91}$, $F_{91}$ and $F_{93}$, respectively. Furthermore, the first to ninth NOR gates $G_1$ to $G_9$ have their output terminals connected to nine, first to ninth, heater actuation circuits $B_1$ to $B_9$, respectively, each of which is composed of a parallel combination of a suitable number of two-input logic NAND gates as shown. The NAND gates constituting each of these heater actuation circuits $B_1$ to $B_9$ are herein assumed and shown, by way of example, as being four in number. Each of the NOR gates $G_1$ to $G_9$ has its output terminal connected to one input terminal of each of the four NAND gates forming each of the heater actuation circuits $B_1$ to $B_9$, respectively. The other input terminals of the NAND gates of the heater actuation circuits $B_1$ to $B_9$ are respectively connected to the output terminals of the individual stages of a shift register 34 which is shown arranged also in parallel with the array of the heater elements 12 of the printing head 10. Though not shown, the shift register 34 is connected to, for example, a computer and is operative to memorize the printing information signals $S_2$ representative, in the form of logic 0 and 1 pulses, of the patterns of information to be printed during each dot printing step. The heater elements 12 to be actuated during each dot printing step are thus selected by, for example, the logic 1 signals supplied from some stages of the shift register 34. The NAND gates of the heater actuation circuits $B_1$ to $B_9$ have their output terminals respectively connected to the heater elements 12 of the printing head 10. These heater elements 12 of the printing head 10 in turn are connected by a common conductor 36 to a suitable source of power (not shown).

The heater elements 12 of the printing head 10 are broken down to groups each consisting of four heater elements 12 which are located adjacent each other and which are respectively connected to the four NAND gates constituting each of the above mentioned heater actuation circuits $B_1$ to $B_9$. The four heater elements 12 forming each of these groups are arranged so that the zone to be heated by the four heater elements 12 has a predetermined length l along the print line $D_p$. This length l is given so that the difference between the length l and the length L of each of the colored sections Y, M and C of the ink ribbon 24 is equal to the previously mentioned distance $\Delta l$ over which the ink ribbon 24 is to be driven to travel during each dot printing step. Thus, the individual groups of the heater elements 12 form a total of nine, first to ninth, unit heating zones $H_1$ to $H_9$ in conjunction with the unit network shown in FIG. 5.

The print control signals $S_1$ to be supplied to the control means 32 (FIG. 4) include a first group of fifteen, first to fifteenth, zone select control signals $T_1$ to $T_{15}$ and a second group of three, first to third, duration control signals $T_y$, $T_m$ and $T_c$ as indicated at the left of FIG. 5. The control signals $T_1$ to $T_{15}$ are supplied in the form of logic 0 and/or 1 pulses and are effective to select out of the above mentioned unit heating zones $H_1$ to $H_9$ a zone or zones to be actuated in response to the printing information signals $S_2$ during each dot printing step. The control signals $T_y$, $T_m$ and $T_c$ of the second group are also supplied in the form of logic 0 and/or 1 pulses and have different pulsewidths to determine the time durations for which the selected ones of the heater elements 12 of the printing head 10 are to be maintained energized during each dot printing step. The optimum time durations for which the heater elements 12 of the printing head 10 are to be maintained energized during each dot printing step differ from one of the colors of the prints to be produced to another and, for this reason, the respective pulsewidths of the duration control signals $T_y$, $T_m$ and $T_c$ are selected to be optimum for the generation of colors by the colored sections Y, M and C of the ink ribbon 24, viz., the yellow, magenta and cyanic blue colors to be produced by the colored sections Y, M and C. In the unit network shown in FIG. 5, the zone select control signals $T_1$ to $T_{15}$ and duration control signals $T_y$, $T_m$ and $T_c$ are supplied to the NAND gates $F_{1y}$ to $F_{9c}$ as follows:

The first zone select control signal $T_1$ is supplied through a line $L_1$ to one input terminal of the NAND gate $F_{11}$. The second zone select control signal $T_2$ is supplied through a line $L_2$ to one input terminal of the NAND gate $F_{61}$. The third zone select control signal $T_3$ is supplied through a line $L_3$ to one input terminal of the NAND gate $F_{21}$. The fourth zone select signal $T_4$ is supplied through a line $L_4$ to one input terminal of the NAND gate $F_{12}$ and to one input terminal of the NAND gate $F_{71}$. The fifth zone select control signal $T_5$ is supplied through a line $L_5$ to one input terminal of the NAND gate $F_{31}$ and to one input terminal of the NAND gate $F_{62}$. The sixth zone select control signal $T_6$ is supplied through a line $L_6$ to one input terminal of the NAND gate $F_{22}$ and to one input terminal of the NAND gate $F_{81}$. The seventh zone select control signal $T_7$ is supplied through a line $L_7$ to one input terminal of the NAND gate $F_{13}$, to one input terminal of the NAND gate $F_{41}$ and to one input terminal of the NAND gate $F_{72}$. The eighth zone select control signal $T_8$ is supplied through a line $L_8$ to one input terminal of the NAND gate $F_{32}$, to one input terminal of the NAND gate $F_{63}$ and to one input terminal of the NAND gate $F_{91}$. The ninth zone select control signal $T_9$ is supplied through a line $L_9$ to one input terminal of the NAND gate $F_{23}$, to one input terminal of the NAND gate $F_{51}$ and to one input terminal of the NAND gate $F_{82}$. The tenth zone select control signal $T_{10}$ is supplied through a line $L_{10}$ to one input terminal of the NAND gate $F_{42}$ and to one input terminal of the NAND gate $F_{73}$. The eleventh zone select control signal $T_{11}$ is supplied through a line $L_{11}$ to one input terminal of the NAND gate $F_{33}$ and to one input terminal of the NAND gate $F_{92}$. The twelfth zone select control signal $T_{12}$ is supplied through a line $L_{12}$ to one input terminal of the NAND gate $F_{52}$ and to one input terminal of the NAND gate $F_{83}$. The thirteenth zone select control signal $T_{13}$ is supplied through a line $L_{13}$ to one input terminal of the NAND gate $F_{43}$. The fourteenth zone select control signal $T_{14}$ is supplied through a line $L_{14}$ to one input terminal of the NAND gate $F_{93}$. The fifteenth zone select control signal $T_{15}$ is supplied through a line $L_{15}$ to one input terminal of the NAND gate $F_{53}$. On the other hand, the first duration control signal $T_y$ is supplied through a line line $L_y$ to the other input terminals of the NAND gates $F_{11}$, $F_{21}$, . . . $F_{91}$. The second duration control signal $T_y$ supplied through a line $L_m$ to the other input terminals of the NAND gates $F_{12}$, $F_{22}$, . . . $F_{92}$. The third duration control signal $T_c$ is supplied through a line $L_c$ to the other input terminals of the NAND gates $F_{13}$, $F_{23}$, . . . $F_{93}$. The signals $T_1$ to $T_{15}$ and the signals $T_y$, $T_m$ and $T_c$ thus distributed to the unit network shown in FIG. 5 are supplied similarly to the counterparts of the NAND gates $F_{11}$ to $F_{93}$ in each of the other unit networks of the complete circuitry through the lines $L_1$ to $L_{15}$ and the lines $L_y$, $L_m$ and $L_c$.

Figure 6:
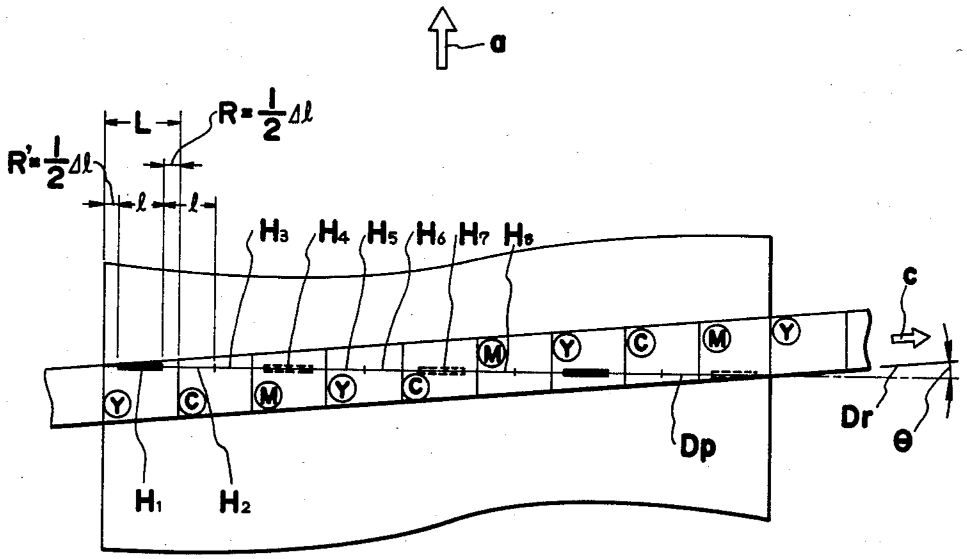
FIG. 6 is a schematic plan view showing the arrangement of the variegated, heat-sensitive ink ribbon extending along the print line in the printing apparatus shown in FIG. 4.
Figure 7:
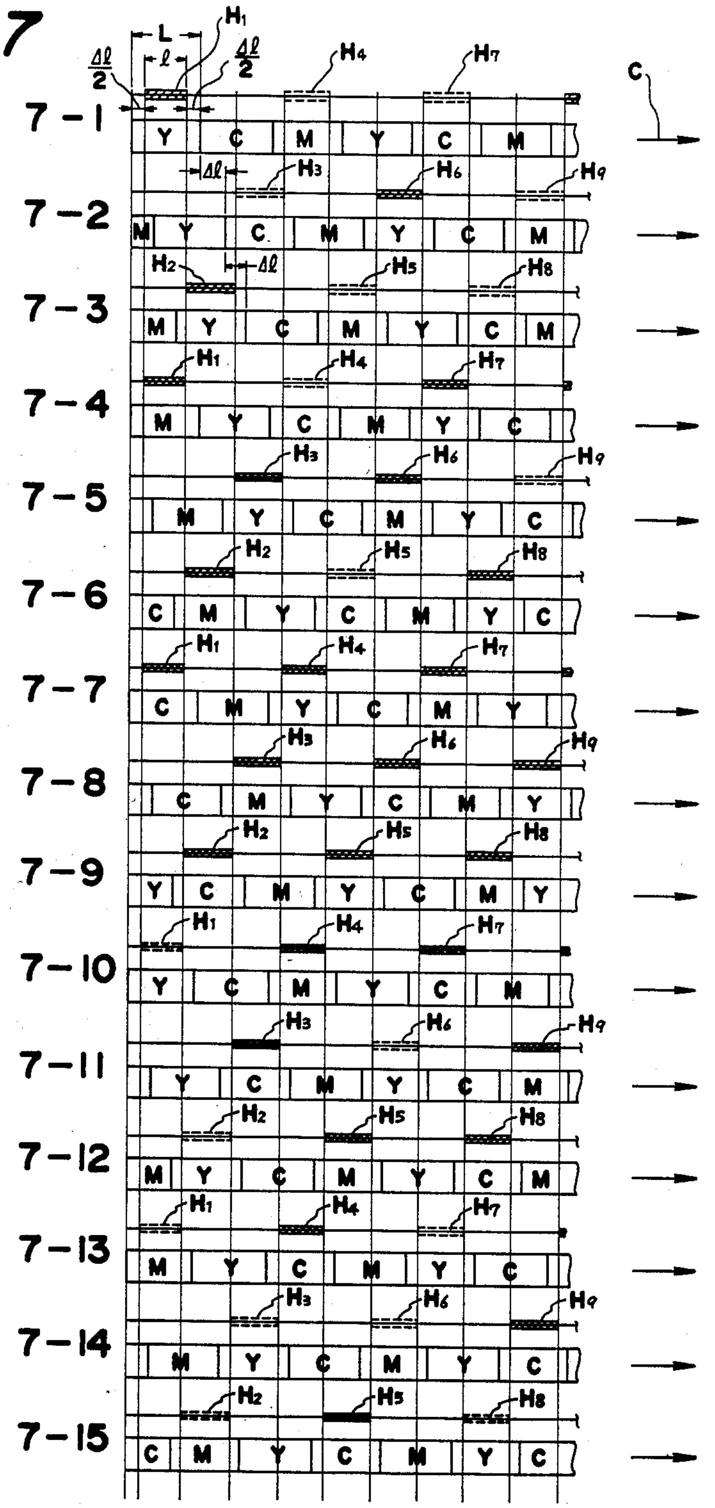
FIG. 7 is a view showing examples of the relationship, achieved during the consecutive dot printing steps of a complete line forming cycle, between a succession of colored sections of the ink ribbon and a succession of unit heating zones of the printing head in the printing apparatus shown in FIG. 4 and controlled by the circuitry including the unit network illustrated in FIG. 5.

Description will now be made with concurrent reference to FIGS. 4 and 5 and further to FIGS. 6 and 7 regarding the mode of operation of the multi-color thermal printing apparatus having the printing head 10 and the control means 32 constructed and arranged as hereinbefore described. In FIG. 6 is shown the arrangement of a portion of the variegated, heat-sensitive ink ribbon 24 extending along the print line $D_p$ in the printing apparatus described with reference to FIG. 4. As will be understood as the description proceeds, a line composed of myriads of dots in the three different colors is printed on the record sheet 14 during a line forming cycle which consists of a predetermined number of dot printing steps which are assumed to be fifteen in number in the arrangement shown in FIG. 5. In FIG. 7 are shown examples of the relationship, obtained in these fifteen consecutive dot printing steps, between a succession of colored sections Y, M and C of the portion under consideration of the ink ribbon 24 and a succession of unit heating zones $H_1$ to $H_9$ of the printing head 10 in the printing apparatus shown in FIG. 4 and controlled by the circuitry including the unit network described with reference to FIG. 5. In each diagram of FIG. 7 is shown only one of the plural series of the unit heating zones constituting the printing head 10, the unit series consisting of the previously mentioned first to ninth unit heating zones $H_1$ to $H_9$. These unit heating zones $H_1$ to $H_9$ are provided in conjunction with the unit network shown in FIG. 5 and, thus, the printing head 10 further has a plurality of other unit series which are similar to the shown unit series of the unit heating zones $H_1$ to $H_9$ and which are respectively associated with the other unit networks of the complete circuitry.

In the multi-color thermal printing apparatus embodying the present invention, each of the line forming cycles of the apparatus follows forward movement of the record sheet 14 over a predetermined distance across the print line $D_p$ in the direction of the arrow a in FIG. 4. Furthermore, each of the dot printing steps of each line forming cycle starts with movement of the ink ribbon 24 in the direction $D_r$ over the predetermined distance $\Delta l$ which is given as the difference between the length L of each colored section of the ink ribbon 24 and the length l of each of the first to ninth unit heating zones $H_1$ to $H_9$ along the print line $D_p$ of the printing head 10 as previously discussed. The ink ribbon 24 having travelled the distance $\Delta l$ with respect to the printing head 10, some of the colored sections Y, M and C of the ink ribbon 24 will be located in registry with the whole coverages of the unit heating zones of the printing head 10 and the others will be located such that each of these colored sections registers partly with a portion of a unit heating zone and partly with a portion of the adjacent unit heating zone. In FIG. 6, it is seen that the portion under consideration of the ink ribbon 24 has three of its colored sections Y, M and C located in registry with the whole coverages of the unit heating zones $H_1$, $H_4$ and $H_7$, respectively, of the printing head 10 with each of the other colored sections located to register partly with a portion of a unit heating zone and partly with a portion of the adjacent unit heating zone. For example, the colored sections C shown next to the leftmost colored section Y of the ink ribbon 24 is seen to register partly with a portion of the unit heating zone $H_2$ and partly with a portion of the unit heating zone $H_3$ adjacent to the zone $H_2$.

The ink ribbon 24 to be used in the printing apparatus is initially position adjusted with respect to the printing head 10 in such a manner that each of those colored sections of the ink ribbon 24 which are to register with the whole coverages of the unit heating zones has marginal areas R and R′ respectively leading forward and trailing rearward from each of these unit heating zones as illustrated for the colored sections Y, M and C registering with the unit heating zones $H_1$, $H_4$ and $H_7$ in FIG. 6. These leading and trailing marginal areas R and R′ may have different lengths but are herein assumed, by way of example, as having equal lengths which are represented by $\Delta l/2$ as also shown in FIG. 6. In the description to follow, the colored sections of the ink ribbon 24 located to have such marginal areas in advance of and behind the unit heating zones will be referred to as "acceptable" sections. In FIGS. 6 and 7, these "acceptable" colored sections are shown as being yellow, magenta and cyanic blue colored sections Y, M and C, respectively, by way of example. As will be understood as the description proceeds, not all of the colored sections which are located to be "acceptable" during a dot printing step are selected for being activated by heat during the dot printing step. Furthermore, the ratio between the length L of each colored section of the ink ribbon 24 and the length l of each unit heating zone of the printing head 10 may be selected arbitrarily insofar as the former is larger than the latter. The distance of travel $\Delta l$ of the ink ribbon 24 being assumed to be approximately one third of the length L as previously noted, the ratio between the length L and the length l is herein assumed to be 3:2. In this instance, the above mentioned acceptable colored sections appear one in every consecutive three of all the colored sections extending along the print line $D_p$ as will be seen from FIG. 6.

Assuming that the ink ribbon 24 driven to travel during a first dot printing step has the colored sections Y, M and C located as shown in FIG. 6, the ink ribbon 24 has three of its colored sections Y, M and C brought into registry with the first, fourth and seventh unit heating zones $H_1$, $H_4$ and $H_7$ of the portion under consideration of the printing head 10, as will be also seen from the diagram 7-1 of FIG. 7. During the first dot printing step, a logic 1 pulse is supplied as the first zone select control signal $T_1$ to one input terminal of the NAND gate $F_{11}$ of the zone select circuit $A_1$ through the line $L_1$ in the network shown in FIG. 5. Simultaneously when the first zone select control signal $T_1$ is thus transmitted to one input terminal of the NAND gate $F_{11}$, logic 1 pulses having different pulsewidths as previously noted are supplied as the first, second and third duration control signals $T_y$, $T_m$ and $T_c$ to the other input terminals of the NAND gates $F_{11}$, $F_{12}$ and $F_{13}$, respectively, of the first zone select circuit $A_1$ through the lines $L_y$, $L_m$ and $L_c$.In the presence of the logic 1 pulses at both of the input terminals of the NAND gate $F_{11}$, a logic 0 pulse appears at the output terminal of the NAND gate $F_{11}$In the presence of the logic 1 pulse ($T_m$, $T_c$) at one input terminal and in the absence of a logic 1 pulse at the other input terminal of each of the other two NAND gates $F_{12}$ and $F_{13}$, there is a logic 1 pulse at the output terminal of each of these NAND gates $F_{12}$ and $F_{13}$. Thus, the logic 0 pulse delivered from the NAND gate $F_{11}$ causes the NOR gate $G_1$ of the first zone select circuit $A_1$ to produce at its output terminal a logic 1 pulse $C_1$ having a pulsewidth equal to that of the first duration control signal $T_y$ supplied to the NAND gate $F_{11}$. The logic 1 pulse $C_1$ produced by the first zone select circuit $A_1$ is fed to one input terminal of each of the four NAND gates forming the first heater actuation circuit $B_1$. The first unit heating zone $H_1$ of the printing head 10 is thus selected as the zone to be heated during the first dot printing step. Of the three acceptable colored sections of the ink ribbon 24 which are in registry with the first, fourth and seventh unit heating zones $H_1$, $H_4$ and $H_7$ of the printing head 10 as shown in the diagram 7-1 of FIG. 7, only the colored section Y in registry with the unit heating zone $H_1$ is in this fashion selected for being activated during the first dot printing step.

Prior to the transmission of the print control signals $T_1$, $T_y$, $T_m$ and $T_c$ to the first zone select circuit $A_1$ as discussed above, the printing information signals $S_2$ representative, in the form of the bits of the logic 0 and/or 1 states, of the patterns and color distribution of the information to be printed are loaded into the shift register 34 from, for example, a computer (not shown). Of the four NAND gates forming the first heater actuation circuit $B_1$, the NAND gates connected to those stages of the shift register 34 which contain bits of the logic 1 state are caused to produce logic 0 pulses at their output terminals in response to the logic 1 output pulse from the first zone select circuit $A_1$. Of the heater elements 12 contained in the first unit heating zone $H_1$ of the printing head 10, furthermore, those connected to the NAND gates thus caused to produce the logic 0 output pulses are actuated to permit a current to flow through these heater elements 12. It therefore follows that the acceptable colored section Y in registry with the unit heating zone $H_1$ is heated and activated by the heat generated by these particular heater elements 12 of the printing head 10 and produces yellow colored dots on the record sheet 14 along the print line $D_p$ underneath the particular colored section Y. Generation of heat by these heater elements 12 lasts for a period of time dictated by the pulsewidth of the first duration control signal $T_y$ supplied to the zone select circuit $A_1$ and, thus, the colored section Y under consideration is heated for a period of time optimum for the generation of yellow color by the particular colored section.

When the colored section Y in registry with the first unit heating zone $H_1$ is being activated to print yellow colored dots by the heater elements 12 forming the unit heating zone $H_1$ as above described, the heater elements 12 forming the other unit heating zones $H_2$ to $H_9$ remain inactive so that there are no dots printed on the record sheet 14 from the colored sections Y, M and C other than the colored section Y in registry with the unit heating zone $H_1$. As will be understood from the diagram 7-1 of FIG. 7, furthermore, the colored section Y being activated by the heater elements 12 of the first unit heating zone $H_1$ has its leading and trailing areas R and R′ maintained inactivated so that there are no dots printed on the record sheet 14 by the heater elements 12 which are located in registry with these marginal areas R and R′. It will further be understood that, during the first dot printing step, those heater elements 12 of the printing head 10 which are associated with the other unit networks of the complete circuitry and which correspond to the heater elements 12 forming the first unit heating zone $H_1$ in the shown arrangement are also actuated to print yellow colored dots on the record sheet 14 from those colored sections Y which are in registry with the unit heating zones corresponding to the unit heating zone $H_1$.

Upon completion of the first dot printing step, the ink ribbon 24 is driven to travel the distance Δl in the direction $D_r$ with respect to the printing head 10 with the result that the portion under consideration of the ink ribbon 24 has its colored sections Y, M and C located as shown in the diagram 7-2 of FIG. 7. As seen in this diagram 7-2, the portion under consideration of the ink ribbon 24 has three acceptable colored sections C, Y and M in registry with the third, sixth and ninth unit heating zones $H_3$, $H_6$ and $H_9$, respectively, of the printing head 10 in the second dot printing step.

During the second dot printing step, a logic 1 pulse is supplied as the second zone select control signal $T_2$ to one input terminal of the NAND gate $F_{61}$ of the sixth zone select circuit $A_6$ through the line $L_2$ in the network shown in FIG. 5. In synchronism with the control signal $T_2$ thus transmitted to the NAND gate $F_{61}$, logic 1 pulses having the different pulsewidths are supplied as the first, second and third duration control signals $T_y$, $T_m$ and $T_c$ to the other input terminals of the NAND gates $F_{61}$, $F_{62}$ and $F_{63}$, respectively, of the sixth zone select circuit $A_6$ through the lines $L_y$, $L_m$ and $L_c$. In the presence of the logic 1 pulses at both of the input terminals of the NAND gate $F_{61}$, a logic 0 pulse appears at the output terminal of the NAND gate $F_{61}$. In the presence of the logic 1 pulse ($T_m$, $T_c$) at one input terminal and in the presence of a logic 0 pulse at the other input terminal of each of the other two NAND gates $F_{62}$ and $F_{63}$, the logic 0 pulse delivered from the NAND gate $F_{61}$ causes the NOR gate $G_6$ of the sixth zone select circuit $A_6$ to produce at its output terminal a logic 1 pulse $C_6$ having a pulsewidth equal to that of the first duration control signal $T_y$ supplied to the NAND gate $F_{61}$. The logic 1 pulse $C_6$ produced by the sixth zone select circuit $A_6$ is fed to one input terminal of each of the four NAND gates forming the sixth heater actuation circuit $B_6$. The sixth unit heating zone $H_6$ of the printing head 10 is thus selected as the zone to be heated during the second dot printing step. Of the three acceptable colored sections of the ink ribbon 24 which are in registry with the third, sixth and ninth unit heating zones $H_3$, $H_6$ and $H_9$ of the printing head 10 shown in the diagram 7-2 of FIG. 7, only the colored section Y in registry with the unit heating zone $H_6$ is in this fashion selected for being activated during the second dot printing step.

On the other hand, the printing information signals $S_2$ representative of the patterns of information to be printed are loaded into the shift register 34 prior to the transmission of the print control signals $T_2$, $T_y$, $T_m$ and $T_c$ to the sixth zone select circuit $A_6$. Of the four NAND gates forming the sixth heater actuation circuit $B_6$, the NAND gates connected to those stages of the shift register 34 which contain bits of the logic 1 state are caused to produce logic 0 pulses at their output terminals in response to the logic 1 output pulse from the sixth zone select circuit $A_6$. Of the heater elements 12 contained in the sixth unit heating zone $H_6$ of the printing head 10, those heater elements 12 which are connected to the NAND gates thus caused to produce the logic 0 output pulses are actuated to permit a current to flow through these heater elements 12. The acceptable colored section Y in registry with the sixth unit heating zone $H_6$ is thus heated and activated by the heat generated by these particular heater elements 12 of the printing head 10 and produce yellow colored dots on the record sheet 14 along the print line $D_p$ underneath the colored section Y.

The second dot printing step is followed by a third dot printing step during which the ink ribbon 24 is further driven to travel the distance Δl so that the portion under consideration of the ink ribbon 24 has its colored sections Y, M and C located as shown in the diagram 7-3 of FIG. 7. As seen in the diagram 7-3, the portion under consideration of the ink ribbon 24 has acceptable colored sections Y, M and C respectively in registry with the second, fifth and eighth unit heating zones $H_2$, $H_5$ and $H_8$ of the printing head 10 in the third dot printing step. During the third dot printing step, a logic 1 pulse is supplied as the third zone select control signal $T_3$ to one input terminal of the NAND gate $F_{21}$ of the second zone select circuit $A_2$ through the line $L_3$. Accordingly, the NOR gate $G_2$ of the second zone select circuit $A_2$ is caused to produce a logic 1 output pulse $C_2$, selecting the second unit heating zone $H_2$ of the printing head 10 as the zone to be heated. Of the three acceptable colored sections Y, M and C of the ink ribbon 24 which are in registry with the second, fifth and eighth unit heating zones $H_2$, $H_5$ and $H_8$ of the printing head 10, only the colored section Y in registry with unit heating zone $H_6$ is activated by the heater elements 12 forming the second unit heating zone $H_2$. Yellow colored dots are thus printed on the record sheet 14 by selected ones of the four heater elements 12 of the unit heating zone $H_2$ in accordance with the bits of the logic 0 and/or 1 states stored in the shift register 34 during the third dot printing step.

In the subsequent fourth dot printing step, the portion under consideration of the ink ribbon 24 has its colored sections Y, M and C located as shown in the diagram 7-4 of FIG. 7 and has acceptable colored sections C, Y and M in registry with the first, fourth and seventh unit heating zones $H_1$, $H_4$ and $H_7$ of the printing head 10. During the fourth dot printing step, a logic 1 pulse is supplied as the fourth zone select control signal $T_4$ to one input terminal of the NAND gate $F_{12}$ of the first zone select circuit $A_1$ and to one input terminal of the NAND gate $F_{71}$ of the seventh zone select circuit $A_7$ through the line $L_4$ in the network shown in FIG. 5. Logic 1 pulses are further supplied as the first, second and third duration control signals $T_y$, $T_m$ and $T_c$ to the other input terminals of the NAND gates $F_{11}$, $F_{12}$ and $F_{13}$, respectively, of the first zone select circuit $A_1$ and to the other input terminals of the NAND gates $F_{71}$, $F_{72}$ and $F_{73}$, respectively, of the seventh zone select circuit $A_7$ through the lines $L_y$, $L_m$ and $L_c$. With the logic 1 pulses appearing at both of the input terminals of the NAND gate $F_{12}$, a logic 0 pulse appears at the output terminal of the NAND gate $F_{12}$. Likewise, a logic 0 pulse appears at the output terminal of the NAND gate $F_{71}$ with the logic 1 pulses appearing at both of the input terminals of the NAND gate $F_{71}$. In the presence of the logic 1 pulses ($T_y$, $T_c$) at both input terminals of the NAND gate $F_{12}$, the logic 0 pulse delivered from the NAND gate $F_{12}$ causes the NOR gate $G_1$ of the first zone select circuit $A_1$ to produce a logic 1 output pulse $C_1$ having a pulsewidth equal to that of the second duration control signal $T_m$ supplied to the NAND gate $F_{12}$. Similarly, the logic 0 pulse delivered from the NAND gate $F_{71}$ causes the NOR gate $G_7$ of the seventh zone select circuit $A_7$ to produce a logic 1 output pulse $C_7$ having a pulsewidth equal to that of the first duration control signal $T_y$ supplied to the NAND gate $F_{71}$. The logic 1 pulses $C_1$ and $C_7$ produced by the first and seventh zone select circuits $A_1$ and $A_7$ are fed to the first and seventh heater actuation circuits $B_1$ and $B_7$, respectively. The first and seventh unit heating zones $H_1$ and $H_7$ of the printing head 10 are thus selected as the zones to be heated during the fourth dot printing step. Of the three acceptable colored sections of the ink ribbon 24 which are in registry with the first, fourth and seventh unit heating zones $H_1$, $H_4$ and $H_7$ of the printing head 10 as shown in the diagram 7-4 of FIG. 7, the colored section M in registry with the unit heating zone $H_1$ and the colored section Y in registry with the unit heating zone $H_7$ are selected for being activated during the fourth dot printing step. Magenta colored dots are thus printed on the record sheet 14 by selected ones of the four heater elements 12 of the unit heating zone $H_1$ and yellow colored dots are printed on the record sheet 14 by selected ones of the four heater elements 12 of the unit heating zone $H_7$ of the printing head 10 in accordance with the bits of data of the logic 0 and/or 1 states stored in the shift register 34 during the fourth dot printing step.

In like manners, yellow colored dots and magenta colored dots are printed on the record sheet 14 by selected ones of the four heater elements 12 of the unit heating zone $H_3$ and the four heater elements 12 of the unit heating zone $H_6$, respectively, of the printing head 10 during the fifth dot printing step as will be seen from the diagram 7-5 of FIG. 7, and magenta colored dots and yellow colored dots are printed on the record sheet 14 by selected ones of the four heater elements 12 of the unit heating zone $H_2$ and selected ones of the heater elements 12 of the unit heating zone $H_8$, respectively, of the printing head 10 during the sixth dot printing step as will be seen from the diagram 7-6 of FIG. 7. During the subsequent seventh dot printing step, dots of three different colors are printed on the record sheet 14, consisting of cyanic colored dots printed by selected ones of the four heater elements 12 of the unit heating zone $H_1$, yellow colored dots printed by selected ones of the four heater elements 12 of the unit heating zone $H_4$ and magenta colored dots printed by selected ones of the four heater elements 12 of the unit heating zone $H_7$ of the printing head 10 as will be seen from the diagram 7-7 of FIG. 7. Dots of three different colors are also printed on the record sheet 14 during each of the eighth and ninth dot printing steps. During the eighth dot printing step, there are printed magenta, cyanic and yellow colored dots by actuating the unit heating zones $H_3$, $H_6$ and $H_9$ of the printing head 10 as will be seen from the diagram 7-8 of FIG. 7 and, during the ninth dot printing step, there are printed cyanic blue, yellow and magenta colored dots printed by actuating the unit heating zones $H_2$, $H_5$ and $H_8$ of the printing head 10 as will be seen from the diagram 7-9 of FIG. 7. In these manners, a line composed of myriads of dots of one, two or three colors is printed on the record sheet 14 along the print line $D_p$ by selective actuation of the first to ninth unit heating zones $H_1$ to $H_9$ of the printing head 10 in accordance with the print control signals $S_1$ and printing information signals $S_2$ supplied to the control means 32 during the line forming cycle consisting of the first to fifteenth dot printing steps, as will be seen from the diagrams 7-1 to 7-15 of FIG. 7. The table at the end of this description shows the schedules of control in accordance with which the unit network shown in FIG. 5 operates during each of the successive line forming cycles each consisting of fifteen dot printing steps.

In the multi-color thermal printing apparatus using the control means 32 operative as hereinbefore described, not all of the colored sections which are located in registry with the whole coverages of the unit heating zones of the printing head 10 and which are thus "acceptable" candidates during each dot printing step are selected for being activated by heat. During the first dot printing step, for example, the ink ribbon 24 has acceptable colored sections Y, M and C in registry with the first, fourth and seventh unit heating zones $H_1$, $H_4$ and $H_7$ as shown in the diagram 7-1 of FIG. 7 but only the colored section Y in registry with the first unit heating zone $H_1$ is activated by heat. During the fourth dot printing step, the ink ribbon 24 also has acceptable colored sections Y, M and C in registry with the first, fourth and seventh unit heating zones $H_1$, $H_4$ and $H_7$ as shown in the diagram 7-4 of FIG. 7 and the colored sections M and Y respectively in registry with the first and seventh unit heating zones $H_1$ and $H_7$ are activated by heat. During the seventh dot printing step, the ink ribbon 24 also has acceptable colored sections Y, M and C in registry with the first, fourth and seventh unit heating zones $H_1$, $H_4$ and $H_7$ as shown in the diagram 7-7 of FIG. 7 and has all of these colored sections Y, M and C activated by heat.

A single complete line of dots in three colors is printed on the record sheet 14 by completion of a total of fifteen dot printing steps. Upon termination of these fifteen steps, the record sheet 14 (FIG. 4) is driven to forwardly advance a predetermined distance for another succession of fifteen dot printing steps.

All the acceptable candidates of the colored sections of the ink ribbon 24 are actually operable as the colored sections to be activated by heat since these sections are located in registry with the whole coverages of the unit heating zones of the printing head 10 and accordingly since the boundaries of each of such sections are located off the unit heating zones of the printing head 10. The purpose for which not all of the acceptable candidates of the colored sections of the ink ribbon 24 are used in some dot printing steps in the printing apparatus using the unit network shown in FIG. 5 is to make it possible to have dots of different colors printed in a predetermined sequence (of, for example, yellow-magenta-cyanic blue) along each of the lines on the record sheet 14 for producing colored patterns of an excellent tone. Where such a purpose is useless or of no importance, the unit network shown in FIG. 5 may be modified in such a manner as to permit all of the acceptable colored sections to be activated unless each of the unit heating zones of the printing head 10 is actuated twice or more for each of the three colors.

Figure 8:
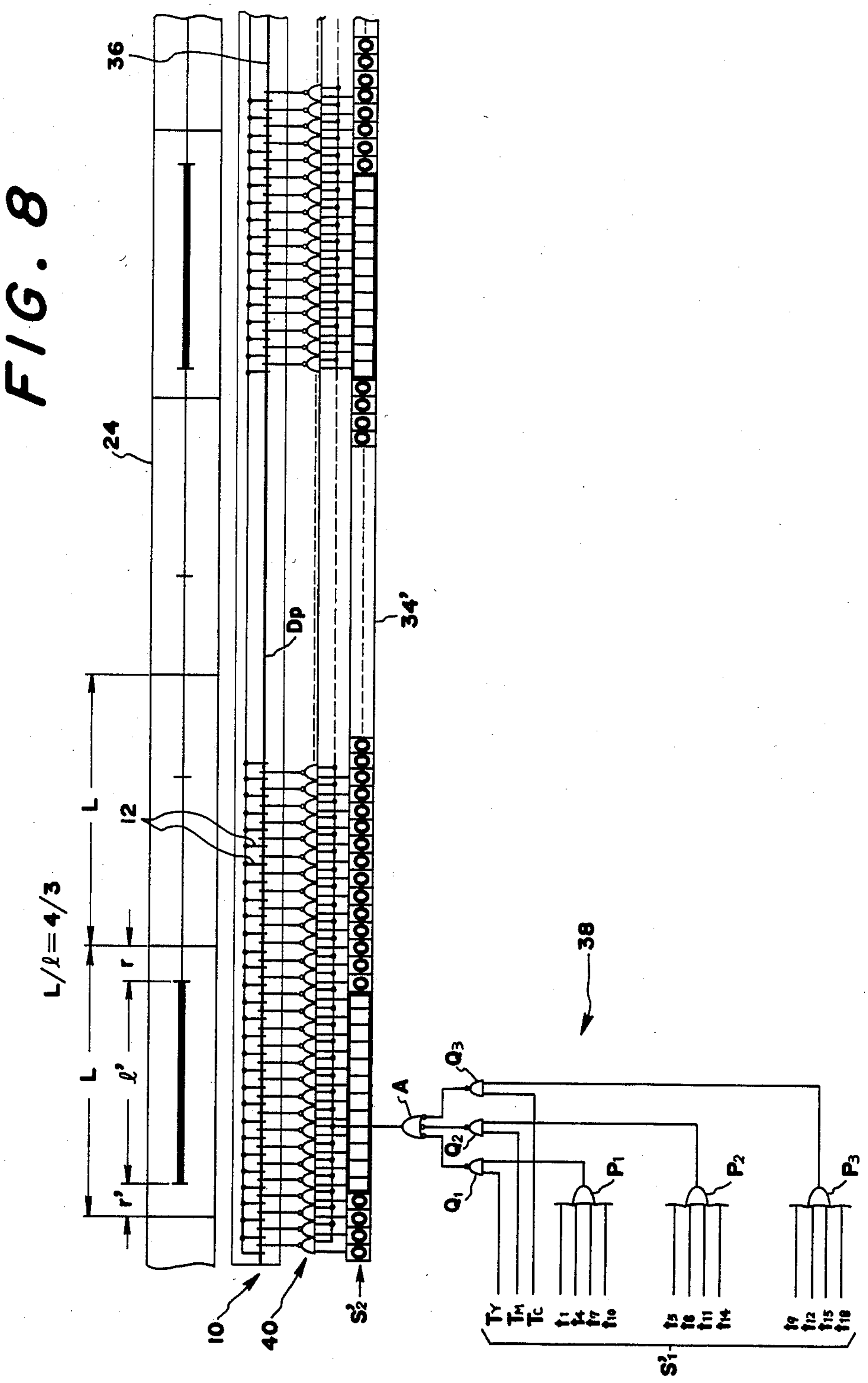
FIG. 8 is a schematic diagram showing part of the circuit arrangement of another preferred example of the circuitry included in electric control means of the embodiment illustrated in FIG. 4.

FIG. 8 shows part of the circuit arrangement of another preferred example of the circuitry included in electric control means 32 of the embodiment illustrated in FIG. 4. In FIG. 8 is further shown part of the arrangement of the heater elements 12 of the printing head 10 in conjunction with the pattern of variegation of the ink ribbon 24 a portion of which is shown at the top of the figure. The arrangement of the heater elements 12 of the printing head 10 is shown below the portion of the ink ribbon 24. In the multi-color thermal printing apparatus to use the circuit arrangement shown in FIG. 8, the drive means including the ribbon drive rollers 26 and 28 as shown in FIG. 4 is controlled to operate in such a manner as to drive the ink ribbon 24 to travel a predetermined distance $\Delta l'$ during each dot printing step. The distance of travel $\Delta l'$ of the ink ribbon 24 is also selected to be smaller than the length L' of each of the colored sections Y, M and C of the ink ribbon 24 and is now assumed, by way of example, to be approximately one fourth of the length L.

The circuitry shown in FIG. 8 comprises a non-selective heater actuation circuit 38 adapted to render all of the individual heater elements 12 of the printing head 10 ready to be actuated when selected. The non-selective heater actuation circuit 38 in turn comprises four-input first, second and third logic OR gates $P_1$, $P_2$ and $P_3$ and is connected to a source (not shown) of a first group of control signals $S_1'$. The first group of control signals $S_1'$ are effective to determine the time durations for which selected ones of the heater elements 12 of the printing head 10 are to be maintained energized during each dot printing step. These control signals $S_1'$ are supplied in the form of logic 0 and/or 1 pulses and include first to fourth color select control signals $t_1$, $t_4$, $t_7$ and $t_{10}$ to be supplied to the first OR gate $P_1$, fifth to eighth color select control signals $t_5$, $t_8$, $t_{11}$ and $t_{14}$ to be supplied to the second OR gate $P_2$, and ninth to twelfth color select control signals $t_9$, $t_{12}$, $t_{15}$ and $t_{18}$ to be supplied to the third OR gate $P_3$. The non-selective heater actuation circuit 38 further comprises two-input first, second and third NAND gates $Q_1$, $Q_2$ and $Q_3$ each having one input terminal connected to the output terminal of each of the first, second and third OR gates $P_1$, $P_2$ and $P_3$, respectively. The above mentioned first group of control signals $S_1'$ further include duration control signals which consist of a first duration control signal $T_y$ to be supplied to the other input terminal of the first NAND gate $Q_1$, a second duration control signal $T_m$ to be supplied to the other input terminal of the second NAND gate $Q_2$, and a third duration control signal $T_c$ to be supplied to the other input terminal of the third NAND gate $Q_3$. As noted previously, these duration control signals $T_y$, $T_m$ and $T_c$ are also supplied in the form of logic 0 and/or 1 pulses and have different pulsewidths to determine the time durations for which the selected ones of the heater elements 12, respectively, of the printing head 10 are to be maintained energized during each dot printing step.

The non-selective heater actuation circuit 38 further comprises a three-input logic NOR gate A having its input terminals connected to the output terminals of the first, second and third NAND gates $Q_1$, $Q_2$ and $Q_3$, respectively. The output terminal of the NOR gate A is connected to a selective heater actuation circuit 40 which is composed of a parallel combination of a suitable number of two-input logic NAND gates which are shown arranged in an array along the array of the heater elements 12 of the printing head 10 as shown. Each of these NAND gates constituting the selective heater actuation circuit 40 has one of its input terminals connected to the output terminal of the NOR gate A. The other input terminals of the NAND gates of the heater actuation circuit 40 are respectively connected to the output terminals of the individual stages of a shift register 34' which is shown arranged also in parallel with the array of the heater elements 12 of the printing head 10. Similarly to its counterpart in the circuit arrangement shown in FIG. 5, the shift register 34' is connected to, for example, a computer and is operative to memorize printing information signals $S_2'$ representative, in the form of bits of the logic 0 and/or 1 states, of the candidate unit heating zones to be actuated during each dot printing step and the patterns and color distribution of the information to be printed during the dot printing step. In the circuit arrangement shown in FIG. 8, the printing information signals $S_2'$ supplied to the shift register 34' are further representative of the schedules in accordance with which the unit heating zones of the printing head 10 are to be actuated during successive dot printing steps. The printing information signals $S_2'$ used in the arrangement shown in FIG. 8 are therefore representative of not only the patterns and color distribution of the information to be printed but the "candidate" unit heating zones which are to come into registry with colored sections of the ink ribbon 24 during each dot printing step and which are to be selected for being actuated during the particular dot printing step. The shift register 34' supplied with such printing information signals $S_2'$ is operative to store logic 1 pulses only in those stages which are connected to the NAND gates connected to the heater elements 12 forming such unit heating zones. The NAND gates of the selective heater actuation circuit 40 have their output terminals respectively connected to the heater elements 12 of the printing head 10. These heater elements 12 of the printing head 10 in turn are connected by a common conductor 36 to a suitable source of power (not shown).

Figure 10:
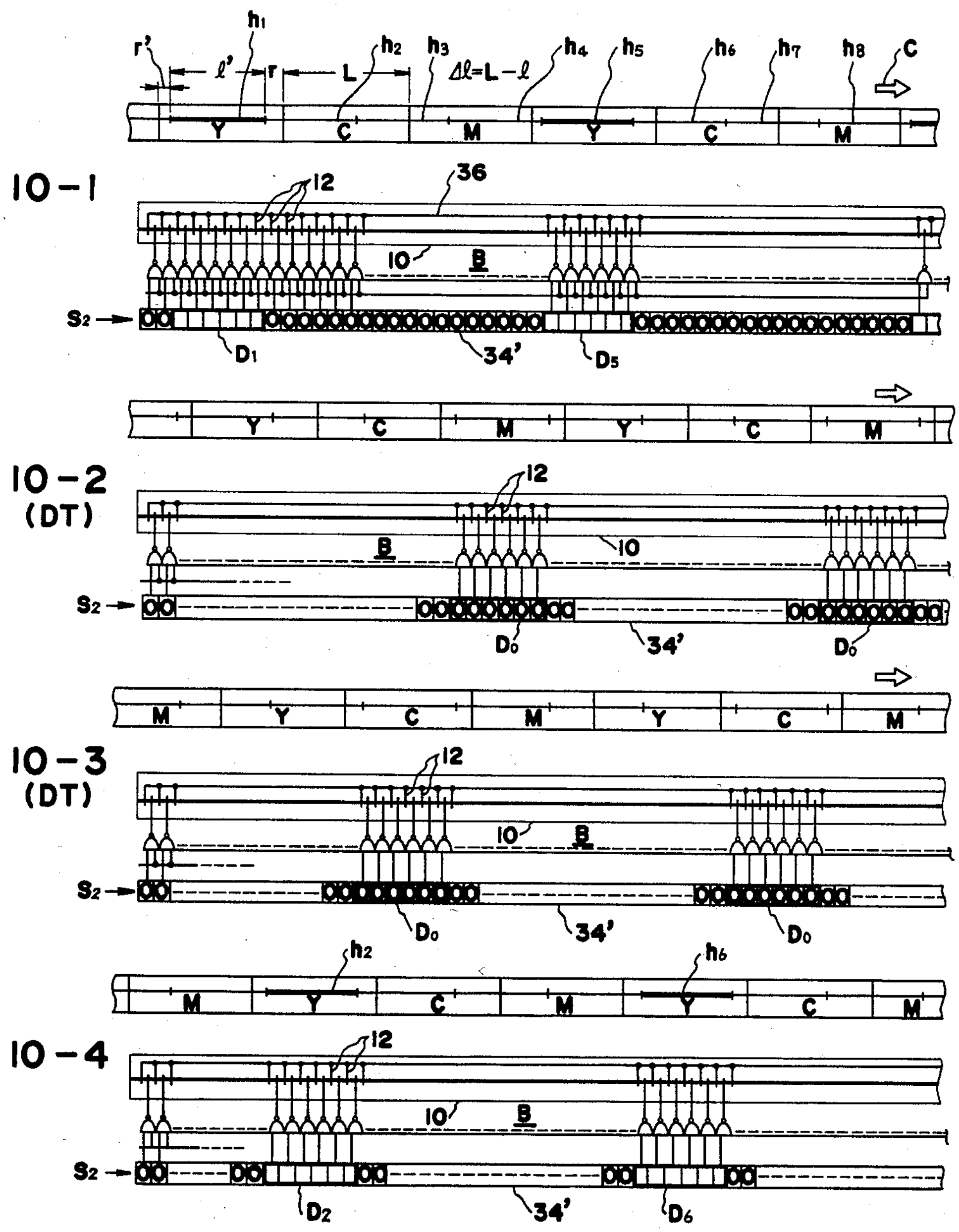
FIG. 10 is a view showing examples of the succession of bits memorized, during some dot printing steps, in the memory means included in the circuit arrangement shown in FIG. 8 in relation to the heater elements of the printing head and a portion of the ink ribbon.

Similarly to the heater elements 12 of the printing head 10 in the arrangement of FIG. 5, the heater elements 12 of the printing head 10 shown in FIG. 8 have groups each consisting of a predetermined number of heater elements 12 which are located adjacent each other. The predetermined number of heater elements 12 forming each of these groups are arranged so that the area to be heated by the heater elements 12 has a predetermined length l' along the print line $D_p$. This length l' is given so that the difference between the length l' and the length L of each of the colored sections Y, M and C of the ink ribbon 24 equals the previously mentioned distance $\Delta l'$ over which the ink ribbon 24 is to be driven to travel during each dot printing step. The distance of travel $\Delta l'$ of the ink ribbon 24 being assumed to be approximately one fourth of the length L as previously noted, the ratio between the length L of each colored section of the ink ribbon 24 and the length l' of each unit heating zone of the printing head 10 is herein assumed to be 4 versus 3. In this instance, acceptable colored sections of the ink ribbon 24, as defined previously, appear one in every consecutive four of all the colored sections extending along the print line $D_p$. The individual groups of the heater elements 12 thus arranged in conjunction with the ink ribbon 24 form unit heating zones $h_1$, $h_2$, $h_3$, . . . along the print line $D_p$ (FIG. 10).

Figure 9:
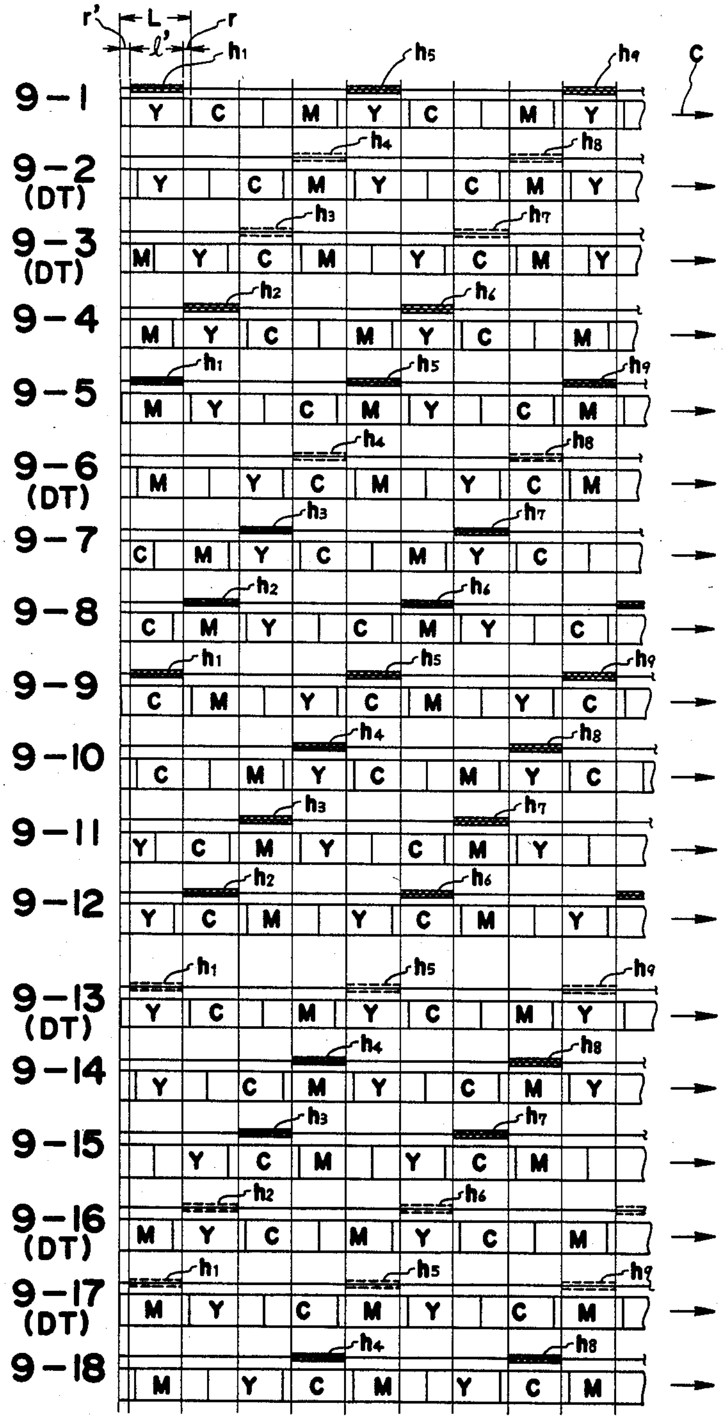
FIG. 9 is a view similar to FIG. 7 but shows examples of the relationship, achieved during the consecutive dot printing steps of a complete line forming cycle, between a succession of colored sections of the ink ribbon and a succession of unit heating zones of the printing head in the apparatus shown in FIG. 4 and controlled by the circuitry including the unit network illustrated in FIG. 8.

FIG. 9 is a view similar to FIG. 7 but shows examples of the relationship, obtained in various consecutive dot printing steps, between a succession of colored sections Y, M and C of the ink ribbon 24 and a succession of unit heating zones $h_1$, $h_2$, $h_3$, . . . of the printing head 10 in the printing apparatus shown in FIG. 4 and controlled by the circuitry illustrated in FIG. 8. In FIG. 9 are shown two of the plural series of the unit heating zones, consisting of a first unit series consisting of four, first to fourth unit heating zones $h_1$ to $h_4$ and a second unit series consisting of four, fifth to eighth unit heating zones $h_5$ to $h_8$. The unit heating zones $h_5$ to $h_8$ of the second unit series are to be actuated according to the same schedules in accordance with which the unit heating zones $h_1$ to $h_4$, respectively, of the first unit series are to be actuated.

Description will now be made with reference to FIGS. 4, 8 and 9 and further to FIG. 10 regarding the operation of the multi-color thermal printing apparatus using the circuit arrangement hereinbefore described with reference to FIG. 8.

As in the embodiment of the printing apparatus using the circuit arrangement of FIG. 5, the ink ribbon 24 in the printing apparatus using the circuit arrangement of FIG. 8 is initially position adjusted with respect to the printing head 10 in such a manner that each of those colored sections of the ink ribbon 24 which are to register with the whole coverages of the unit heating zones has leading and trailing marginal areas r and r′ between which each of the unit heating zones intervenes, as illustrated for the colored sections Y registering with the unit heating zones $h_1$ and $h_5$ in the diagram 9-1 of FIG. 9. These leading and trailing marginal areas r and r′ are herein also assumed, by way of example, as having equal lengths which are represented by $\Delta l'/2$.

When the ink ribbon 24 driven to travel during a first dot printing step has the colored sections Y, M and C located as shown in the diagram 9-1 of FIG. 7, colored sections Y of the ink ribbon 24 are brought into registry with the first and fifth unit heating zones $h_1$ and $h_5$ of the portion under consideration of the printing head 10, as will be also seen from the diagram 7-1 of FIG. 7. During the first dot printing step, a logic 1 pulse is supplied as the first color select control signal $t_1$ to one input terminal of the first OR gate $P_1$ of the non-selective heater actuation circuit 38 in the circuit arrangement shown in FIG. 8. This causes the first OR gate $P_1$ to supply a logic 1 output pulse to one input terminal of the first NAND gate $Q_1$. In the presence of logic 0 pulses at all the input terminals of the second and third OR gates $P_2$ and $P_3$, a logic 0 pulse is present at the output terminal of each of these OR gates $P_2$ and $P_3$. Simultaneously when the first color select control signal $t_1$ is transmitted to the OR gate $P_1$, logic 1 pulses having different pulsewidths as previously noted are supplied as the first, second and third duration control signals $T_y$, $T_m$ and $T_c$ to the other input terminals of the NAND gates $Q_1$, $Q_2$ and $Q_3$, respectively. In the presence of the logic 1 pulses at both of the input terminals of the first NAND gate $Q_1$, a logic 0 pulse appears at the output terminal of the NAND gate $Q_1$. In the presence of the logic 1 pulse ($T_m$, $T_c$) at one input terminal and in the presence of a logic 0 pulse at the other input terminal of each of the other two NAND gates $Q_2$ and $Q_3$, there is no logic 0 pulse at the output terminal of each of these NAND gates $Q_2$ and $Q_3$. Thus, the logic 0 pulse delivered from the first NAND gate $Q_1$ causes the NOR gate A to produce at its output terminal a logic 1 pulse having a pulsewidth equal to that of the first duration control signal $T_y$ supplied to the NAND gate $Q_1$. The logic 1 pulse produced in this fashion by the non-selective heater actuation circuit 38 is fed to one input terminal of each of the NAND gates forming the selective heater actuation circuit 40.

Prior to the transmission of the control signals $t_1$, $T_y$, $T_m$ and $T_c$ to the non-selective heater actuation circuit 38 as discussed above, the printing information signals $S_2'$ representative, in the form of bits of data of the logic 0 and/or 1 states, of the patterns and color distribution of the information to be printed and the schedules in accordance with which the unit heating zones of the printing head 10 are to be selected are loaded into the shift register 34′. These printing information signals $S_2'$ are written, as indicated at $D_1$ and $D_5$ in the diagram 10-1 of FIG. 10, only into those stages of the shift register 34′ which are connected to the NAND gates connected to the heater elements 12 forming the unit heating zones $h_1$ and $h_5$ in register with the colored sections Y which are rendered "acceptable" during the first dot printing step. Accordingly, the bits of data representative of the pattern of information to be printed during the first dot printing step are contained only in those stages of the shift register 34′ which correspond to the acceptable colored sections Y, the remaining stages of the shift register 34′ being loaded with bits of the 0 state. The result is that, of the NAND gates forming the selective heater actuation circuit 40, those NAND gates connected to these particular stages of the shift register 34′ are caused to produce logic 0 pulses at their output terminals in response to the logic 1 output pulse from the non-selective heater actuation circuit 38. Of the heater elements 12 contained in the first and fifth unit heating zones $h_1$ and $h_5$ of the printing head 10, furthermore, those heater elements 12 which are connected to the NAND gates thus caused to produce the logic 0 output pulses are actuated to permit a current to flow through these heater elements 12. It therefore follows that the acceptable colored sections Y in registry with the unit heating zones $h_1$ and $h_5$ are heated and activated by the heat generated by these particular heater elements 12 of the printing head 10 and produce yellow colored dots on the record sheet 14 along the print line $D_p$ underneath the particular colored sections Y. Generation of heat by these heater elements 12 lasts for a period of time dictated by the duration of the first duration control signal $T_y$ supplied to the non-selective heater actuation circuit 38 and, thus, the colored sections Y are heated for a period of time optimum for the generation of yellow color by the particular colored sections.

When the colored sections Y in registry with the first and fifth unit heating zones $h_1$ and $h_5$ are being activated to print yellow colored dots on the record sheet 14 (FIG. 4) by the heater elements 12 forming the unit heating zones $h_1$ and $h_5$ as above described, the heater elements 12 forming the other unit heating zones $h_2$ to $h_4$ and $h_6$ to $h_8$ remain inactive so that there are no dots printed on the record sheet 14 from the colored sections (M and C) other than the colored sections Y in registry with the unit heating zones $h_1$ and $h_5$. As will be further understood from the diagram 9-1 of FIG. 9, each of the colored sections Y being activated by the heater elements 12 of the first and fifth unit heating zones $h_1$ and $h_5$ has its leading and trailing areas r and r′ maintained inactive so that there are no dots printed on the record sheet 14 by the heater elements 12 which are located in registry with these marginal areas r and r′. It will further be understood that, during the first dot printing step, those heater elements 12 of the printing head 10 which are contained in the other unit series of the printing head 10 and which correspond to the heater elements 12 forming the first and fifth unit heating zones $h_1$ and $h_5$ of the unit series in the shown arrangement are also actuated to print yellow colored dots on the record sheet 14 from those colored sections Y which are in registry with the unit heating zones corresponding to the unit heating zones $h_1$ and $h_5$.

As in the case of the apparatus using the circuit arrangement of FIG. 5, not all the acceptable candidates of the colored sections of the ink ribbon 24 are activated in some dot printing steps in the printing apparatus using the circuitry shown in FIG. 8. All the acceptable candidates of the colored sections of the ink ribbon 24 are however actually operable as the colored sections to be activated by heat also in the printing apparatus using the circuitry shown in FIG. 8. The purpose for which not all of the acceptable candidates of the colored sections of the ink ribbon 24 are used in some dot printing steps in the printer using the unit network shown in FIG. 8 is thus also to produce colored patterns of an excellent tone. Where such a purpose is useless or of no importance, the circuitry shown in FIG. 8 may also be modified to permit all of the acceptable colored sections to be activated unless each of the unit heating zones of the printing head 10 is actuated twice or more for each of the three colors.

Upon completion of the first dot printing step, the ink ribbon 24 is driven to travel the distance Δl' in the direction $D_r$ (FIG. 4) with respect to the printing head 10 with the result that the portion under consideration of the ink ribbon 24 has its colored sections Y, M and C located as shown in the diagram 9-2 of FIG. 9. As seen in this diagram 9-2, the portion under consideration of the ink ribbon 24 has acceptable colored sections M in registry with the fourth and eighth unit heating zones $h_4$ and $h_8$, respectively, of the printing head 10 in the second dot printing step.

During the second dot printing step, there are no control signals $S_1'$ supplied to the non-selective heater actuation circuit 38 and the shift register 34' has bits of the 0 state stored therein at all of its stages as indicated at Do in the diagram 10-2 of FIG. 10. Under this condition, all the NAND gates forming the selective heater actuation circuit 40 produce logic 1 output signals so that all the heater elements 12 of the printing head 10 remain de-energized. Thus, the second dot printing step is a downtime period (DT) in which there are no prints produced on the record sheet 14 (FIG. 4), as will be seen from the diagram 9-2 of FIG. 9 in which the fourth and eighth unit heating zones $h_4$ and $h_8$ are indicated by broken lines. In the subsequent third dot printing step, the ink ribbon 24 is driven to travel so that the portion under consideration of the ribbon 24 has acceptable colored sections C in registry with the third and seventh unit heating zones $h_3$ and $h_7$, respectively, of the printing head 10 as shown in the diagram 9-3 of FIG. 9. The third dot printing step is however also a downtime period with no control signals $S_1'$ of the first group supplied to the non-selective heater actuation circuit 38. Thus, the shift register 34' also has stored 0 state bits therein at all of its stages as indicated at Do in the diagram 10-3 of FIG. 10, there being accordingly no prints produced on the record sheet 14.

During the fourth dot printing step, the ink ribbon 24 is driven to travel so that the portion under consideration of the ribbon 24 has acceptable colored sections Y in registry with the second and sixth unit heating zones $h_2$ and $h_6$, respectively, of the printing head 10 as shown in the diagram 9-4 of FIG. 9. During this dot printing step, a logic 1 pulse is supplied as the second color select control signal $t_4$ to one input terminal of the first OR gate $P_1$ of the non-selective heater actuation circuit 38. Thus, the NOR gate A is caused to produce a logic 1 output pulse in response to the logic 0 output pulse supplied from the first NAND gate $Q_1$ as in the case of the first dot printing step. The result is that the heater elements 12 forming the second and sixth unit heating zones $h_1$ and $h_5$ of the printing head 10 are actuated selectively in response to the bits of date of the 0 and/or 1 states memorized in the shift register 34 as indicated at $D_2$ and $D_6$ in the diagram 10-4 of FIG. 10. The acceptable colored sections Y in registry with the unit heating zones $h_2$ and $h_5$ are heated and activated by the heat generated by these particular heater elements 12 of the printing head 10, thereby producing yellow colored dots on the record sheet 14.

In the subsequent fifth dot printing step, the ink ribbon 24 is driven to travel so that the portion under consideration of the ribbon 24 has acceptable colored sections M in registry with the first and fifth unit heating zones $h_1$ and $h_5$, respectively, of the printing head 10 as shown in the diagram 9-5 of FIG. 9. During the fifth dot printing step, a logic 1 pulse is supplied as the third color select control signal $t_5$ to one input terminal of the second OR gate $P_2$ of the non-selective heater actuation circuit 38. This causes the second OR gate $P_2$ to supply a logic 1 output pulse to one input terminal of the second NAND gate $Q_2$. In the presence of logic 0 pulses at all the input terminals of the first and third OR gates $P_l$ and $P_3$, a logic 0 pulse is present at the output terminal of each of these OR gates $P_1$ and $P_3$. Simultaneously when the third color select control signal $t_5$ is transmitted to the OR gate $P_2$, logic 1 pulses having different pulsewidths are supplied as the first, second and third duration control signals $T_y$, $T_m$ and $T_c$ to the NAND gates $Q_1$, $Q_2$ and $Q_3$, respectively. In the presence of the logic 1 pulses at both of the input terminals of the second NAND gate $Q_2$, a logic 0 pulse appears at the output terminal of the NAND gate $Q_2$. In the presence of the logic 1 pulse ($T_y$, $T_c$) at one input terminal and in the presence of a logic 0 pulse at the other input terminal of each of the other two NAND gates $Q_1$ and $Q_3$, there is no logic 0 pulse at the output terminal of each of these NAND gates $Q_1$ and $Q_3$. Thus, the logic 0 pulse delivered from the second NAND gate $Q_2$ causes the NOR gate A to produce at its output terminal a logic 1 pulse having a pulsewidth equal to that of the second duration control signal $T_m$ supplied to the OR gate $P_2$. The logic 1 pulse produced by the non-selective heater actuation circuit 38 is fed to one input terminal of each of the NAND gates forming the selective heater actuation circuit 40. The result is that the heater elements 12 forming the first and fifth unit heating zones $h_1$ and $h_5$ of the printing head 10 are actuated selectively in response to the bits of date of the 0 and/or 1 states memorized in the shift register 34'. The acceptable colored sections Y respectively in registry with the unit heating zones $h_1$ and $h_5$ are heated and activated by the heat generated by these particular heater elements 12 of the printing head 10 and produce magenta colored dots on the record sheet 14.

A single complete line of dots in three colors is in these manners printed on the record sheet 14 by a total of eighteen dot printing steps including a total of six downtime periods which are indicated at DT in FIG. 9. During the first, fourth, seventh and tenth dot printing steps, the first OR gate $P_1$ is supplied with the first, second, third and fourth color select control signals $t_1$, $t_4$, $t_7$ and $t_{10}$ and, accordingly, the colored sections Y alone of the ink ribbon 24 are activated as will be seen from the diagrams 9-1, 9-4, 9-7 and 9-10, respectively, of FIG. 9 for the durations dictated by the pulsewidth of the first duration control signal $T_y$. During the fourth, eighth, eleventh and fourteenth dot printing steps, the second OR gate $P_2$ is supplied with the fifth, sixth, seventh and eighth color select control signals $t_5$, $t_8$, $t_{11}$ and $t_{14}$ and, accordingly, the colored sections M alone of the ink ribbon 24 are activated as will be seen from the diagrams 9-5, 9-8, 9-11 and 9-14, respectively, of FIG. 9 for the durations dictated by the pulsewidth of the second duration control signal $T_m$. During the ninth, twelfth, fifteenth and eighteenth dot printing steps, the third OR gate $P_3$ is supplied with the ninth, tenth, eleventh and twelfth color select control signals $t_9$, $t_{12}$, $t_{15}$ and $t_{18}$ and, accordingly, the colored sections C alone of the ink ribbon 24 are activated as will be seen from the diagrams 9-9, 9-12, 9-15 and 9-18, respectively, of FIG. 9 for the durations dictated by the pulsewidth of the third duration control signal $T_c$, The second, third, sixth, thirteenth, sixteenth and seventeenth dot printing steps are downtime periods DT as will be seen from the diagrams 9-2, 9-3, 9-6, 9-13, 9-16 and 9-17, respectively, of FIG. 9.

While it has been assumed that the ratio between the length L of each of the colored sections Y, M and C of the ink ribbon 24 and the length l or l' of each of the heater elements 12 of the printing head 10 in the embodiments hereinbefore described is selected at 3:2 or 4:3, such is merely by way of example and may be changed arbitrarily upon selection of the locations and number of the unit heating zones to be put to use during each dot printing step insofar as the "acceptable" colored sections have leading and trailing marginal areas. Furthermore, these leading and trailing areas of each acceptable colored section have been assumed to be equal in length but may have different lengths if desired.

TABLE

| Zone select control signals $t_1$-$t_{15}$ | Zone select control circuits $A_1$-$A_9$ | Pulses $C_1$-$C_9$ | Heater actuation circuits $B_1$-$B_9$ | Effective duration control signals $T_y$, $T_m$, $T_c$ | Selected heating zones $H_1$-$H_9$ | Reference diagrams of FIG. 7 |
|---|---|---|---|---|---|---|
| $t_1$ | $A_1$ | $C_1$ | $B_1$ | $T_y$ | $H_1$ | 7-1 |
| $t_2$ | $A_6$ | $C_6$ | $B_6$ | $T_y$ | $H_6$ | 7-2 |
| $t_3$ | $A_2$ | $C_2$ | $B_2$ | $T_y$ | $H_2$ | 7-3 |
| $t_4$ | $A_1$, $A_7$ | $C_1$, $C_7$ | $B_1$, $B_7$ | $T_m$, $T_y$ | $H_1$, $H_7$ | 7-4 |
| $t_5$ | $A_3$, $A_6$ | $C_3$, $C_6$ | $B_3$, $B_6$ | $T_y$, $T_m$ | $H_3$, $H_6$ | 7-5 |
| $t_6$ | $A_2$, $A_8$ | $C_2$, $C_8$ | $B_2$, $B_8$ | $T_m$, $T_y$ | $H_2$, $H_8$ | 7-6 |
| $t_7$ | $A_1$, $A_4$, $C_1$, | $B_1$, $B_4$ | $T_c$, $T_y$ | $H_1$, $H_4$ | 7-7 | |
| | $C_4$ | | | | | |
| | $A_7$ | $C_7$ | $B_7$ | $T_m$ | $H_7$ | |
| $t_8$ | $A_3$, $A_6$, $A_9$ | $C_3$, $C_6$ $C_9$ | $B_3$, $B_6$ $B_9$ | $T_m$, $T_c$ $T_y$ | $H_3$, $H_6$ $H_9$ | 7-8 |
| $t_9$ | $A_2$, $A_5$, $A_8$ | $C_2$, $C_5$ $C_8$ | $B_2$, $B_5$ $B_8$ | $T_c$, $T_y$ $T_m$ | $H_2$, $H_5$ $H_8$ | 7-9 |
| $t_{10}$ | $A_4$, $A_7$ | $C_4$, $C_7$ | $B_4$, $B_7$ | $T_m$, $T_c$ | $H_4$, $H_7$ | 7-10 |
| $t_{11}$ | $A_3$, $A_9$ | $C_3$, $C_9$ | $B_3$, $B_9$ | $T_c$, $T_m$ | $H_3$, $H_9$ | 7-11 |
| $t_{12}$ | $A_5$, $A_8$ | $C_5$, $C_8$ | $B_5$, $B_8$ | $T_m$, $T_c$ | $H_5$, $H_8$ | 7-12 |
| $t_{13}$ | $A_4$ | $C_4$ | $B_4$ | $T_c$ | $H_4$ | 7-13 |
| $t_{14}$ | $A_9$ | $C_9$ | $B_9$ | $T_c$ | $H_9$ | 7-14 |
| $t_{15}$ | $A_5$ | $C_5$ | $B_5$ | $T_c$ | $H_5$ | 7-15 |

What is claimed is:

1. A method of printing dots of at least two different colors, the at least two different colors including first and second colors, on a record sheet with use of a printing head having a multiplicity of heater elements which are arranged in an array extending along a substantially straight print line and which are operative to produce heat independently of one another and an elongated heat-sensitive ink ribbon intervening between the record sheet and the array of said heater elements and lengthwise extending generally in parallel with said print line, the ink ribbon having a series of recurrent colored sections which occur successively in a single row lengthwise of the ribbon and which are contiguous to one another, said color sections being inked in said colors, the colored sections of said first and second colors occuring, lengthwise of the ink ribbon, successively and recurrently with a unit series including one colored section of the first color and one colored section of the second color so that the colored sections of the ink ribbon extending along the print line at any point of time include colored sections of all the at least two, all the colored sections of the ink ribbon having a predetermined length, the method having a succession of line forming cycles each for forming a single line of dots in at least one of said different colors on the record sheet, each of the line forming cycles consisting of a predetermined number of plurality of dot printing steps, comprising driving the record sheet to advance a predetermined distance across said print line in a direction substantially perpendicular to the print line during each line forming cycle;

driving said ink ribbon to travel with respect to said printing head in a predetermined direction which is generally parallel with but angled at a small angle to said print line so that each of the color sections of said ink ribbon is located in registry with a plurality of heater elements of said printing head during each dot printing step;

providing control signals from an external source and on the basis of said control signals, selecting out of said heater elements of the printing head the heater elements to be actuated to generate heat during each dot printing step; and actuating the selected heater elements for producing dots of at least one of said colors on said ink ribbon during each dot printing step.

2. A method as set forth in claim 1, wherein said step of driving the ink ribbon comprises the step of driving the ink ribbon a predetermined distance of travel smaller than said length of each of said colored sections of the ink ribbon.

3. A method as set forth in claim 2, wherein said step of actuating the selected heater elements includes the steps of actuating during said each dot printing step heater elements of said printing head in one or more preselected groups of a plurality of groups each consisting of a predetermined number of heater elements and forming a unit heating zone having a predetermined length in a direction parallel with said print line.

4. A method as set forth in claim 3, wherein step of driving the ink ribbon comprises the step of driving the ink ribbon to travel during each dot printing step a distance substantially equal to the difference between said predetermined length of each of the colored sections of said ink ribbon and the predetermined length of said unit heating zone so that the colored sections of the ink ribbon have groups each consisting of a predetermined number of colored sections and including one colored section which is in part in registry with the whole coverage of one of the unit heating zones of the printing head during each printing step.

5. A method as set forth in claim 4, wherein said step of driving said ink ribbon comprises the step of driving said ink ribbon to travel such that the colored section registering with the whole coverage of one of the unit heating zones has a leading marginal area terminating at the foremost end of the registering colored section and a trailing marginal area terminating at the rearmost end of the registering colored section.

6. A method as set forth in claim 5, wherein the steps of actuating selected heater elements during each line forming cycle include the steps of actuating the heater elements forming each of said unit heating zones of the printing head to generate heat only once for each of said different colored sections along said print line.

7. A method as set forth in claim 6, in which selected ones of the heater elements of said printing head are actuated to generate heat for at least one of said different colored sections of each of said groups during each dot printing step.

8. A method as set forth in claim 6, in which selected ones of the heater elements of said printing head are actuated to generate heat for only one of said different colored sections of each of said groups during each dot printing step.

9. A method as set forth in claim 10, in which the dot printing steps of each of said line forming cycles include downtime periods during which all of the heater elements of said printing head are maintained inoperative.

10. A method as set forth in claim 4 wherein each dot printing step includes the step of selecting at least one of said unit heating zones to be ready for being actuated, with a first group of control signals, said step of actuating selected heater elements including the step of selecting at least one of the heater elements of the selected at least one of the unit heating zones to be actuated, with a second group of control signals, the number of the unit heating zones being selected to be ready to be actuated being variable from one dot printing step to another.

11. A method as set forth in claim 10, in which the selected unit heating zones of said printing head are maintained ready to be actuated for durations which vary from one of the colors of said colored sections to another.

12. A method as set forth in claim 4, in which the dot printing steps of each of said line forming cycles include a dot printing cycle which includes the step of selecting at least one of said unit heating zones to be ready for being actuated with a first group of control signals and a dot printing step during which none of said unit heating zones is selected so that all of said heater elements of the printing head are maintained inoperative, said step of actuating selected heater elements including the step of selecting at least one of the heater elements of the unit heating zone selected to be ready for being actuated with a second group of control signals.

13. A method as set forth in claim 12, in which the unit heating zones selected to be ready for being actuated are maintained ready to be actuated for time durations which vary from one of said different colors to another.

14. A method as set forth in claim 12, wherein said step of actuating selected heater elements includes the steps of selecting colors of the colored sections with electrical color select control signals respectively representative of the colors of the colored sections of said ink ribbon, and controlling the duration which the selected ones of said heater elements are to be actuated during the dot printing step with electrical duration control signals.

15. A method as set forth in claim 14, wherein said step of actuating selected heater elements further includes the steps of selecting the pattern and color distribution of the information to be printed during each dot printing step with electrical printing information signals, at least one of the heater elements included in selected one of said unit heating zones being selected on the basis of said printing information signals.

16. A method as set forth in claim 14, in which the time durations of said duration control signals vary from one of the colors of said colored sections to another.

17. A multi-color thermal printing apparatus for printing dots of at least two different colors including first and second colors on a record sheet, comprising sheet driving means for driving the record sheet in a predetermined direction during a line forming cycle consisting of a predetermined number of dot printing steps;

a printing head including a multiplicity of heater elements which are arranged in an array extending along a print line substantially perpendicular to the direction of travel of the record sheet and which are operative to produce heat independently of one another when actuated;

an elongated heat-sensitive ink ribbon intervening between the record sheet and said array of said heat elements and lengthwise extending generally in parallel with said print line, said ink ribbon having a series of recurrent colored sections which occur successively in a single row lengthwise of said ribbon and which are contiguous to one another, said color sections being inked in said colors, said colored sections of said first and second colors occurring, lengthwise of said ink ribbon, successively and recurrently with a unit series including one colored section of said first color and one colored section of said second color so that said colored sections of said ink ribbon extending along said print line at any point of time include colored sections of all of said at least two different colors, all said colored sections of said ink ribbon having a predetermined length;

ribbon drive means for driving said ink ribbon in a direction which is generally parallel with but angled at a small angle to said print line so that each of the color sections of said ink ribbon is located in registry with a plurality of said multiplicity of heater elements of said printing head; and control means for selecting out of said heater elements of the printing head heater elements to be actuated to generate heat for producing dots of at least one of said colors on said ink ribbon during each dot printing step.

18. A multi-color thermal printing apparatus as set forth in claim 17, in which the heater elements of said printing head have a plurality of groups each consisting of a predetermined number of heater elements and forming a unit heating zone having in a direction parallel with said print line a predetermined length smaller than said predetermined length of each of the colored sections of said ink ribbon and in which said ribbon drive means is operative to drive said ink ribbon a predetermined distance in said predetermined direction during each of said dot printing steps, the predetermined distance of travel of the ink ribbon being substantially equal to the difference between said predetermined length of each of the colored sections of said ink ribbon and said predetermined length of said unit heating zone so that the individual colored sections of the ink ribbon include along said print line those colored sections each of which is in part in registry with the whole coverage of one of the unit heating zones of the printing head during each dot printing step.

19. A multi-color thermal printing apparatus as set forth in claim 18, in which said control means is operative to select candidate unit heating zones out of the individual unit heating zones of said printing head, one of the colored sections of said ink ribbon being in part in registry with the whole coverage of each of said candidate unit heating zones during each dot printing step, said control means being further operative to select at least one out of said candidate unit heating zones and to select at least one heater element from the selected candidate unit heating zone for permitting the selected heater element to be actuated during the dot printing step.

20. A multi-color thermal printing apparatus as set forth in claim 19, in which said control means comprises a source of a first group of control signals representative of acceptable unit heating zones each having its whole coverage in registry with one of the colored sections of the ink ribbon during each dot printing step, said first group of control signals being further representative of the time durations for which selected one of the heater elements are to be actuated during each dot printing step; a source of a second group of control signals representative of the pattern and color distribution of the information to be printed during each dot printing step; zone select means responsive to the first group of control signals and operative to produce output signals effective to render said acceptable unit heating zones of the printing head ready to be actuated in response to the second group of control signals during each dot printing step; and heater actuation means responsive to said second group of control signals and to the output signals from said zone select means and operative to select at least one of the heater elements of the selected unit heating zone on the basis of the second group of control signals and to actuate the selected heater elements for the time durations represented by said first group of control signals during each dot printing step.

21. A multi-color thermal printing apparatus as set forth in claim 20, in which said first group of control signals include zone select control signals produced sequentially during each line forming cycle and representative of said acceptable unit heating zones of the printing head and duration control signals produced concurrently in each dot printing step and representative of the time durations for which selected ones of said heater elements are to be actuated during each dot printing step, said zone select means comprising a plurality of zone select circuits each of which is responsive to a predetermined number of said zone select control signals and to each of said duration control signals during each dot printing step, each of said zone select circuits being operative to produce an output signal in the presence of one of the zone select control signal and one of the duration control signals.

22. A multi-color thermal printing apparatus as set forth in claim 21, in which each of said zone select circuits comprises a predetermined number of logic NAND gate circuits each having one input terminal responsive to one of said zone select control signals and another input terminal responsive to one of said duration control signals, a logic NOR gate circuit having input terminals respectively connected to the output terminals of said logic NAND gate circuits and an output terminal connected to said heater actuation means.

23. A multi-color thermal printing apparatus as set forth in claim 22, in which said heater actuation means comprises a plurality of logic NAND gate circuits respectively associated with said heater elements of said printing head and each having one input terminal connected to said NOR gate circuit and another input terminal connected to said source of said second group of control signals.

24. A multi-color thermal printing apparatus as set forth in claim 19, in which said control means comprises a source of a first group of control signals representative of the colors of the colored sections of said ink ribbon and the time durations for which selected ones of said heater elements are to be actuated during each dot printing step; a source of a second group of control signals representative of the pattern and color distribution of the information to be printed during each dot printing step and of candidate unit heating zones of said printing head which may be actuated during the dot printing step; non-selective heater actuation means responsive to the first group of control signals and operative to produce output signals representative of the durations represented by said first group of control signals during each dot printing step; and selective heater actuation means responsive to said second group of control signals and to the output signals from said non-selective heater actuation means and operative to select at least one of the heater elements of each of said candidate unit heating zones on the basis of the second group of control signals.

25. A multi-color thermal printing apparatus as set forth in claim 24, in which said first group of control signals include color select control signals produced sequentially during each line forming cycle and effective to select one out of the colors of the colored sections of said ink ribbon during each dot printing step and duration control signals produced concurrently during each dot printing step and effective to determine the time durations for which selected ones of said heater elements are to be actuated during each dot printing step, said non-selective heater actuation means being responsive to a predetermined number of said color select control signals and to each of said duration control signals during each dot printing step and being operative to produce an output signal in the presence of one of the color select control signals and the duration control signals.

26. A multi-color thermal printing apparatus as set forth in claim 25, in which said non-selective heater actuation means comprises a logic NAND gate circuit responsive to each of said color select control signals and to each of said duration control signals, and a logic NOR gate circuit having input terminals respectively connected to the output terminals of said logic NAND gate circuits and an output terminal connected to said selective heater actuation means.

27. A multi-color thermal printing apparatus as set forth in claim 26, in which said selective heater actuation means comprises a plurality of logic NAND gate circuits respectively associated with said heater elements of said printing head and each having one input terminal connected to said NOR gate circuit and another input terminal connected to said source of said second group of control signals.

* * * * *